(12) United States Patent  (10) Patent No.: US 6,453,420 B1
Collart  (45) Date of Patent: Sep. 17, 2002

(54) SYSTEM, METHOD AND ARTICLE OF MANUFACTURE FOR AUTHORIZING THE USE OF ELECTRONIC CONTENT UTILIZING A LASER-CENTRIC MEDIUM

(75) Inventor: Todd R. Collart, Los Altos, CA (US)

(73) Assignee: Research Investment Network, Inc., Irvine, CA (US)

( * ) Notice: Subject to any disclaimer, the term of this patent is extended or adjusted under 35 U.S.C. 154(b) by 0 days.

(21) Appl. No.: 09/296,098

(22) Filed: Apr. 21, 1999

(51) Int. Cl.[7] .............................................. G06F 12/14

(52) U.S. Cl. ........................... 713/201; 705/51; 705/57; 705/58; 380/201; 380/202

(58) Field of Search ................................. 713/200, 201; 709/219, 217; 705/51, 55, 56; 380/201, 202, 203; 711/100, 154, 163

(56) References Cited

U.S. PATENT DOCUMENTS

| | | |
|---|---|---|
| 4,709,813 A | 12/1987 | Wildt |
| 4,710,754 A | 12/1987 | Montean |
| 4,967,185 A | 10/1990 | Montean |
| 5,128,752 A | 7/1992 | Van Kohorn |
| 5,305,195 A | 4/1994 | Murphy |
| 5,305,197 A | 4/1994 | Axler et al. |
| 5,347,508 A | 9/1994 | Montbriand et al. |
| 5,353,218 A | 10/1994 | De Lapa et al. |
| 5,410,343 A | 4/1995 | Coddington et al. |
| 5,420,403 A | 5/1995 | Allum et al. ............... 235/375 |
| 5,483,658 A | 1/1996 | Grube et al. |
| 5,568,275 A | 10/1996 | Norton et al. |
| 5,651,064 A | 7/1997 | Newell |
| 5,673,195 A | 9/1997 | Schwartz et al. |
| 5,696,898 A | 12/1997 | Baker et al. |

(List continued on next page.)

FOREIGN PATENT DOCUMENTS

| | | |
|---|---|---|
| DE | 42 42 992 A1 | 6/1994 |
| EP | 0 372 716 A2 | 6/1990 |
| EP | 0762422 | 8/1996 |
| EP | 0802527 | 10/1996 |
| EP | 0814419 | 6/1997 |
| EP | 0853315 | 1/1998 |
| EP | 0 849 734 A2 | 6/1998 |
| JP | 11039262 A | 12/1999 |
| WO | 9847080 | 10/1998 |
| WO | 9858368 | 12/1998 |
| WO | WO 00/02385 | 1/2000 |
| WO | WO 00/08855 | 2/2000 |
| WO | WO 00/16229 | 3/2000 |
| WO | WO 00/18054 | 3/2000 |
| WO | WO 00/24192 | 4/2000 |

OTHER PUBLICATIONS

Mascha M Et Al: "Interactive education: Transitioning CD–ROMS to the Web" Computer Networks and ISDN Systems, NL, North Holland Publishing. Amsterdam, vol. 27, No. 2, Nov. 1, 1994, pp. 267 through 272.

(List continued on next page.)

Primary Examiner—Ly V. Hua
(74) Attorney, Agent, or Firm—Keiji Masaki; Steve A. Wong

(57) ABSTRACT

A system, method, and article of manufacture is provided for tracking the distribution of content electronically. First, an electronic storage medium tracking identifier is incorporated onto an electronic storage medium and stored on a database. Next, a package tracking identifier is situated onto a package in which the electronic storage medium is stored. The electronic storage medium is then tracked while being shipped between various entities using the tracking identifier on the package. Further, the electronic storage medium may be identified using the tracking identifier on the electronic storage medium in order to afford authorized use of the information contained on the electronic storage medium.

20 Claims, 24 Drawing Sheets

U.S. PATENT DOCUMENTS

| | | | |
|---|---|---|---|
| 5,751,672 A | 5/1998 | Yankowski | 369/30 |
| 5,802,294 A | 9/1998 | Ludwig et al. | |
| 5,804,810 A | 9/1998 | Woolley et al. | 235/492 |
| 5,822,291 A | 10/1998 | Brindze et al. | 369/94 |
| 5,857,021 A * | 1/1999 | Kataoka et al. | 380/4 |
| 5,860,068 A | 1/1999 | Cook | |
| 5,892,900 A | 4/1999 | Ginter et al. | |
| 5,892,908 A | 4/1999 | Hughes et al. | |
| 5,893,910 A | 4/1999 | Martineau et al. | |
| 5,895,073 A | 4/1999 | Moore | |
| 5,899,980 A | 5/1999 | Wilf et al. | |
| 5,915,093 A * | 6/1999 | Berlin et al. | 709/219 |
| 5,920,694 A | 7/1999 | Carleton et al. | |
| 5,930,238 A | 7/1999 | Nguyen | |
| 5,940,504 A | 8/1999 | Griswold | |
| 5,960,398 A | 9/1999 | Fuchigami et al. | |
| 5,991,798 A | 11/1999 | Ozaki et al. | |
| 6,006,328 A | 12/1999 | Drake | |
| 6,009,410 A | 12/1999 | LeMole et al. | |
| 6,012,071 A | 1/2000 | Krishna et al. | |
| 6,016,166 A | 1/2000 | Huang et al. | |
| 6,018,768 A | 1/2000 | Ullman et al. | |
| 6,034,937 A * | 3/2000 | Kumagai | 369/59 |
| 6,035,329 A | 3/2000 | Mages et al. | 709/217 |
| 6,044,403 A | 3/2000 | Gerszberg et al. | |
| 6,055,314 A | 4/2000 | Spies et al. | |
| 6,097,291 A | 8/2000 | Tsai et al. | |
| 6,097,814 A | 8/2000 | Mochizuki | |
| 6,101,180 A | 8/2000 | Donahue et al. | |
| 6,128,649 A | 10/2000 | Smith et al. | |
| 6,182,222 B1 * | 1/2001 | Oparaji | 713/200 |

OTHER PUBLICATIONS

European Patent Office, Patent Abstracts of Japan: Publication No. 10063562, Publication date Jun. 3, 1998; Application Date Aug. 21, 1996, Application No. 08219994; Applicant Hitachi LTD; Inventor Kuwabara Teiji; Int.Cl. G06F 12/00 G06F13/00 G06F 13/00; Title: Package Medium, Electronic Mail and Terminal Equipment.

E Media Professional Reviews, by NSM Galaxy Jukebox and David Doering, http://www.emediapro.net.

Active Video Watching Using Annotation by Nuno Correia and Teresa Chambel, ACM Digital Library, International Multimedia Conference, Oct. 30–Nov. 5, 1999, in Orlando, Florida.

No Modem Needed: TV Signals Bring the Web to Your PC by Michael S. Lasky, Computing Storypage, CNN IDG.net, May 19, 1998.

All About DIVX, Where the Facts are Told and the Decision is Y ours! Webmaster's Note Jan. 26, 1999, http://www.prodivx.com.

* cited by examiner

DVD life Cycle (pre-InterActual)

Overview:
1) Very similar life cycle to a video cassette: video is authored, distributed to retail centers/outlets, purchased by consumer for playback on TVs.
2) Linear life cycle: No further contact with consumer.

FIGURE 4

DVD life Cycle (w/InterActual's Software)

Overview:
1) PC market offers a completely new phase to DVD's life cycle: marketing. Motivating PC consumers to purchase and interact with DVDs provides for additional branding and direct marketing opportunities online.
2) Performance and usage information collected online can be used to influence content creation process - turning the linear life span into a cyclical one.
3) Internet can be used to deliver new content.

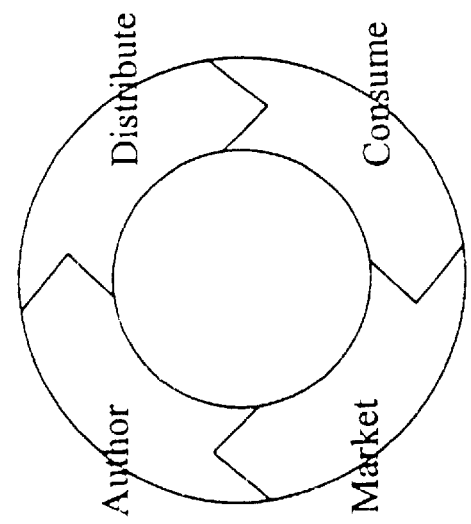

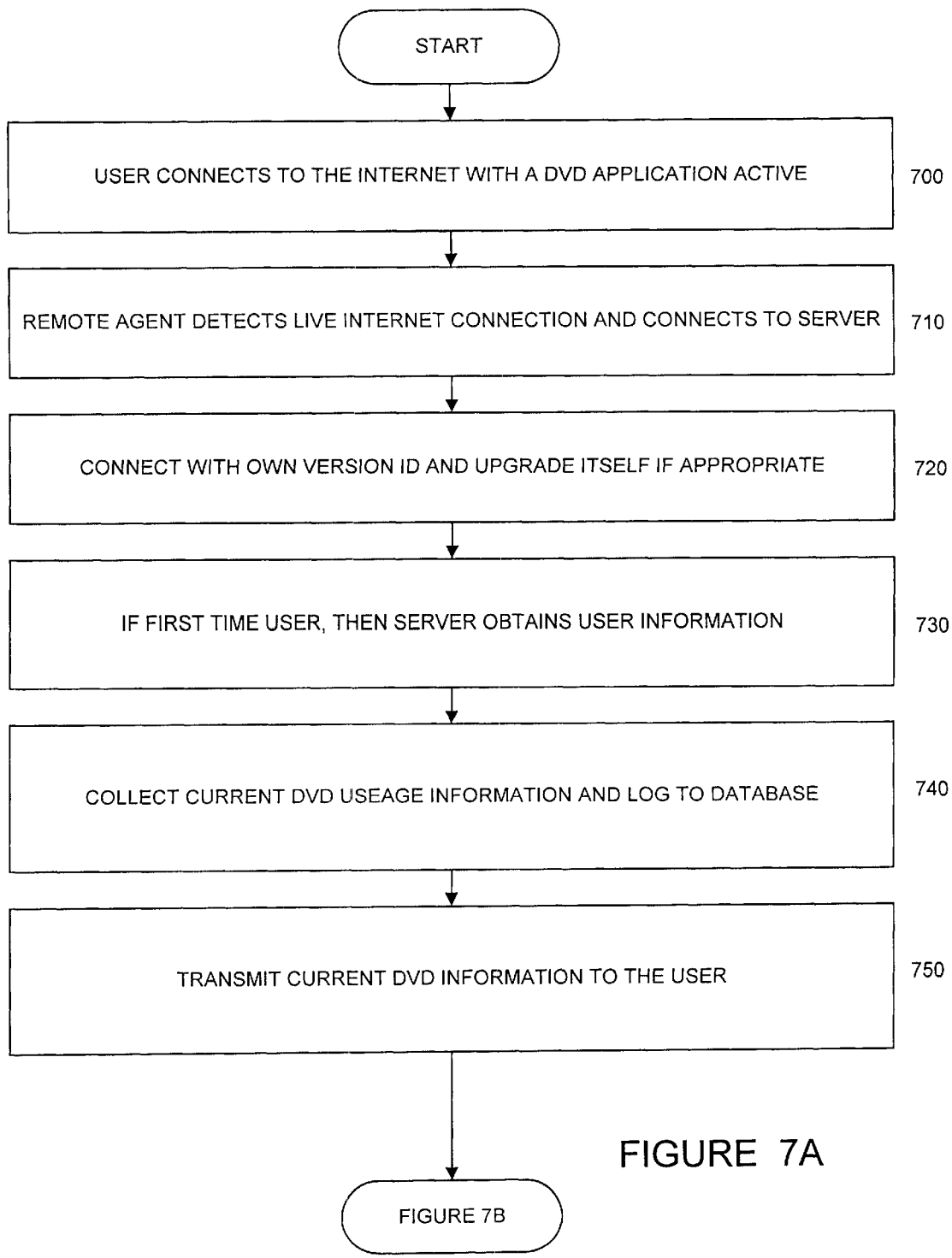

SYSTEM, METHOD AND ARTICLE OF MANUFACTURE FOR AUTHORIZING THE USE OF ELECTRONIC CONTENT UTILIZING A LASER-CENTRIC MEDIUM

FIELD OF THE INVENTION

The present invention relates to a distribution and tracking system that utilizes a set of bits on an electronic medium to track and control use of content electronically.

BACKGROUND OF THE INVENTION

The now familiar compact disk preserves information as a series of microscopic pits and smooth areas, oriented in concentric circular or helical tracks, on the otherwise smooth, planar surface of an annular disk. Recorded information is read from a compact disk by directing a focused laser beam along the recorded tracks, and detecting variations in the intensity of the laser beam as it encounters the microscopic pits and smooth areas on the disk. The coherence and relatively short wavelength of laser radiation enables large volumes of information to be written onto very small spaces of a recording medium.

Compact disks were first introduced in the music recording industry in 1982, and now account for 43% of all recorded music sales. In the United States alone, over three hundred million compact disks are sold annually, with a retail value of over three billion dollars, according to the Recording Industry Association of America. The recording industry has for the last ten years packaged the five inch in diameter prerecorded compact disks in six inch by twelve inch cardboard boxes known in the industry as "long boxes." The long box is easily propped up in display bins alongside traditional vinyl LPs in music store display bins. More importantly, however, the bulk of the long box makes it difficult for a shoplifter to hide a prerecorded compact disk under a coat or in a purse and walk out of a music store without paying. While the long box packaging technique for prerecorded compact disks has been somewhat effective as an anti-theft device, the excess packaging it creates accounts for as much as twenty five million pounds of packaging waste annually.

The Recording Industry Association of America accordingly announced in 1991 its intention to abandon the long box. In February of 1992, the Association announced that, beginning in April 1993, all prerecorded compact disks would be marketed in five inch by five and one half inch packages.

When Compact Discs (CD)s or Digital Video or Versatile Disks (DVD)s are manufactured, they are frequently transported and stored on spindles. This is at least in part due to the fragile nature of the storage medium. Since each disk has a center hole, is relatively thin and is relatively light, storage of multiple discs on a spindle is convenient. Spindles, as used in the manufacture of disks, typically have a central post about two feet long and weighted base about two inches thick. Depending upon the level of automation of the disk manufacturing process, disks may be stored or carried on spindles several times before printing or packaging. In the most fully automated processes, disks are only kept on spindles between the inspection and printing steps and just prior to final packaging. In more manual systems, disks may be placed on spindles between every manufacturing step including between molding and metalizing, between metalizing and spin coating, between spin coating and inspection, between inspection and printing, and between printing and final packaging. However, regardless of the number of times the disks are maintained on spindles, each such time the disk is removed for processing, a possibility of theft and confusion as to title exists. In other words, whenever a disk is on a spindle, particularly without any identifying printing, the identification of the title on that spindle may easily be called into question or be confused. It is essential that a capability be built into a disk to track the disk and provide distribution management, quality control and customer access information.

Similarly, whenever disks are maintained on a spindle for any length of time, theft can occur. Without any means of preventing unauthorized removal of disks from the spindle or tracking exactly how many disks were on the spindle, thefts regularly happen.

The merchandising of compact disc (hereinafter "CD") multimedia is a growing industry. CD multimedia are used in audio, video, audio-video, and computer based applications. Since many similar looking duplicate recordings for a particular CD program are often available from many different sources, it is difficult for merchants to track, identify, and distinguish their inventory from the inventory of others.

Security is an important concern associated with the rental, loan, or sale of such merchandise. Items such as commercially prerecorded compact disc programs are available from rental shops, stores, and libraries. It is important for a merchant to have a simple means to secure and identify its merchandise. For example, a merchant needs to determine whether merchandise which was rented from it is the same merchandise that is being returned to it to deter customers from attempting to switch good rented merchandise with bad return merchandise (such as a customer's scratched disc).

The switching of CDs in good condition with defective CDs obtained from other sources is a difficult problem that merchants face. Merchandise switching is a significant problem given the high volume of business involved in the compact disc industry and the difficulty of detecting such illegal switching. An easy and reliable way for a merchant to determine whether the digital data contained on a CD is damaged or defective is required. Although obvious imperfections such as scratches or cracks may be detected by a simple visual inspection, such inspection cannot detect defects in the digital data. Even though defects may be discovered during regular speed playback of an entire CD, such means is commercially impractical since it requires too much time for merchants dealing in high volume to check every CD returned to them. Although high-speed electronic scanning devices for checking digital recordings currently exist, such devices are effectively unavailable to the individual merchant due to cost prohibitions and the limited availability of such technology.

Electronic article surveillance systems for monitoring the egress of sensitive objects from controlled spaces are well known, and have been used alone and along with the long box packaging technique for controlling the unauthorized taking of compact disks. Markers formed from a piece of high permeability magnetic material can be placed on the packaging for the disk. Spaced apart detection panels are then placed across the access points to the store, library or other repository for the monitored compact disks. The panels include field coils and detector coils for producing a magnetic field across the access point that can detect the passage of a marker between the panels. If a person attempts to carry a compact disk through the magnetic field presented by the panels without first deactivating the marker on the disk packaging, the presence of the marker will be detected and an alarm initiated.

U.S. Pat. No. 4,710,754 discloses a multi-directional EAS marker especially designed for its compact dimensions. The marker disclosed in the '754 patent is comprised of a high permeability, low coercive force, generally planar magnetic responder material that includes at least two narrow regions defining switching sections, and adjacent, wider, flux collector sections. The juxtaposition of the narrow switching sections with the flux collector sections causes the flux to be highly concentrated in the switching sections. The high concentration of flux lines in the switching sections produces high frequency harmonics when passed through an alternating magnetic field, allowing the presence of the marker in the field to be detected. The marker is conveniently made dual status, i.e., reversibly deactivatable and reactivatable, by including a piece of magnetizable material adjacent each of the switching sections. The magnetizable material, when magnetized, biases the adjacent switching section to either keep the magnetization therein from reversing when in an alternating interrogation field, or at least altering the response of the marker in the field. In either case, readily distinguishably different signals are produced by the marker in an interrogation field depending on whether the magnetizable material is magnetized or demagnetized.

U.S. Pat. No. 4,967,185 discloses a multi-directional, dual-status EAS marker also designed for its compact dimensions. The marker disclosed in the '185 patent discloses a marker that includes a continuous uninterrupted sheet of remanently magnetizable material overlying a sheet of responder material similar to that disclosed in the '754 patent. The response of the marker within an alternating magnetic field can be discernably altered by selectively magnetizing and demagnetizing the continuous sheet of remanently magnetizable material prior to introducing the marker into the field. The markers disclosed in the above noted prior art can be attached to the packaging for a compact disk. Problems arise, however, when attempting to attach prior art markers directly to the surface of a compact disk. Rotation of the compact disk is required to read information from the disk, and the disk must accordingly be inherently balanced. An EAS marker, applied directly to a compact disk, therefor, would preferably be somehow concentrically mounted on the disk without imbalancing the disk. Prior art EAS markers, however, are not inherently balanced. Moreover, conventional compact disks include a centered aperture that must be maintained clear of obstructions, and the preferred prior art dual status EAS markers include a continuous sheet of magnetic material, such that the marker cannot be concentrically mounted to the surface of a compact disk without obstructing the disk aperture.

U.S. Pat. No. 4,709,813 proposed an anti-theft device for compact disks that overcame the inability to directly apply an EAS marker to the surface of a compact disk. The '813 patent discloses a detachable locking plate with an EAS marker carried on the internal face of the plate that can be selectively locked to the "jewelry box" for a compact disk. The compact disk is physically locked in the box leg by the plate. A clerk or other authorized person can remove the plate with the use of a keyed release tool at the time of payment. It will be appreciated that the use of a locking plate requires preparation time to attach a plate to each compact disk cartridge, adds an additional step in the check-out process, and leaves the compact disk without EAS protection once the EAS marker carrying plate is removed from the compact disk. The lack of EAS protection once the plate is removed makes it especially risky for a retailer to permit the trial playing of a compact disk by a customer in the store before the compact disk is purchased. The new packaging standard for prerecorded compact disks, while environmentally sound, will exacerbate the problem of compact disk shop lifting, since the smaller packages will be easier to hide and transport out of a store.

While the use of electronic article surveillance systems could partially compensate for the increased shoplifting threat, it will be appreciated that the unauthorized removal of the magnetic markers from a package will defeat the detection capability of the surveillance system, and known EAS markers cannot be directly mounted on a compact disk without affecting the operability of the disk. The use of an EAS marker in conjunction with a locking plate presents handling problems and does not solve the problem of physical security of compact disks at stores where the customer is allowed to listen to the compact disk prior to purchase. A new, compact optical information disk especially designed for tamper-proof use with an electronic article surveillance system through the use of an EAS marker that could be applied directly to the surface of the compact disk would accordingly provide decided advantages. Thus, there is a need for merchants to conveniently and inexpensively maintain the security of their electronic content medium.

SUMMARY OF THE INVENTION

A system, method, and article of manufacture is provided for tracking the distribution of content electronically. First, an electronic storage medium tracking identifier is incorporated onto an electronic storage medium and stored on a database. Next, a package tracking identifier is situated onto a package in which the electronic storage medium is stored. The electronic storage medium is then tracked while being shipped between various entities using the tracking identifier on the package. Further, the electronic storage medium may be identified using the tracking identifier on the electronic storage medium in order to afford authorized use of the information contained on the electronic storage medium.

DESCRIPTION OF THE DRAWINGS

The foregoing and other objects, aspects and advantages are better understood from the following detailed description of a preferred embodiment of the invention with reference to the drawings, in which:

FIG. 4 is a pictorial representation of a comparison of the prior lifecycle of electronic storage medium and the electronic storage medium of the present invention;

FIGS. 7A and 7B are flowcharts setting forth the detailed logic associated with user connection and update for DVD processing in accordance with a preferred embodiment;

DETAILED DESCRIPTION

Figure 1:
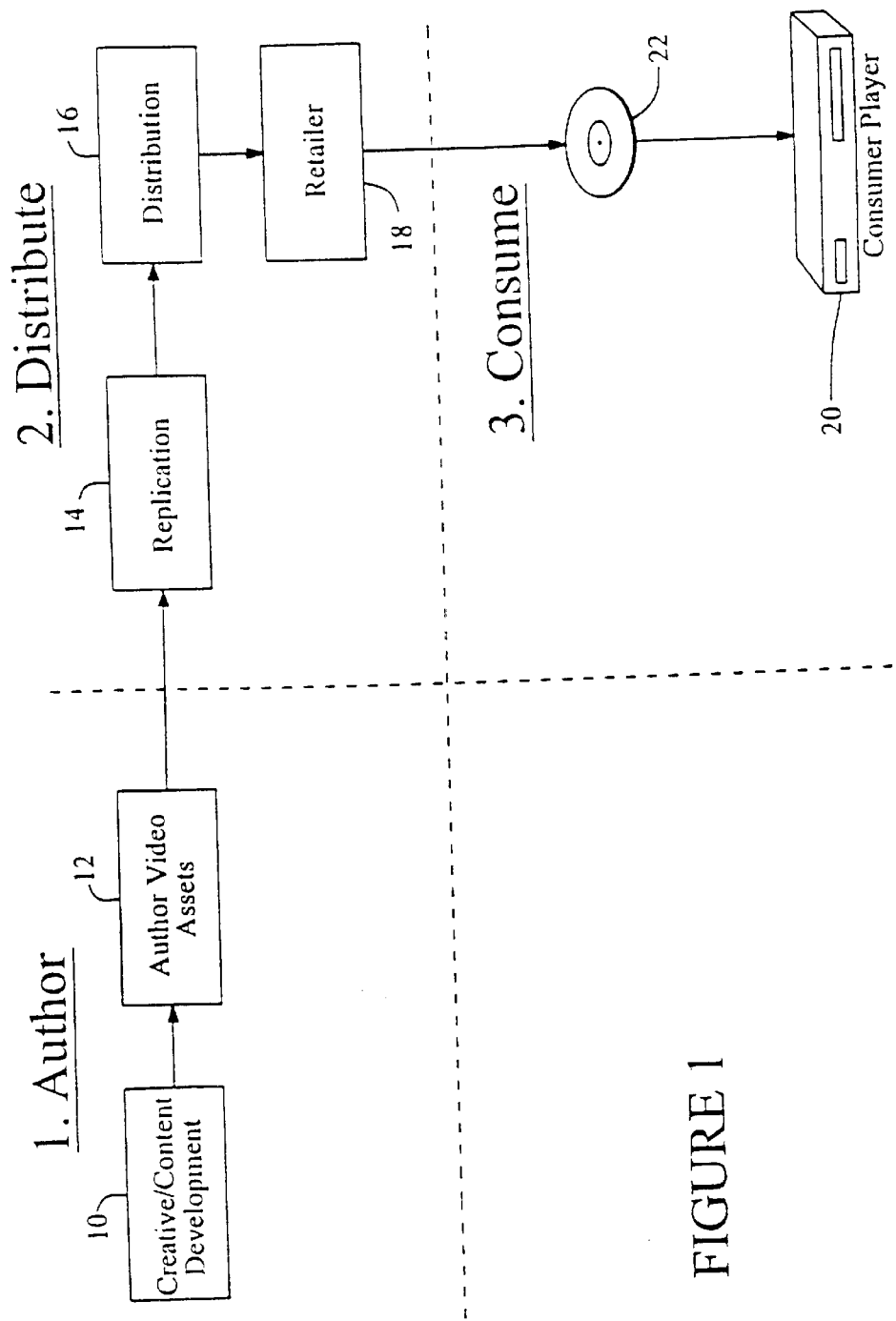
FIG. 1 is a general block diagram of the method of tracking an electronic medium in accordance with the present invention.

The present invention includes a system, method and article of manufacture for tracking the distribution of content electronically and providing intelligent services based on this information. FIG. 1 is a general block diagram of the method of tracking an electronic medium in accordance with the present invention. Initially, content in the form of music, video, data, or any other type of visual or audible entertainment or information is generated in operations 10 and 12. Thereafter, an electronic storage medium tracking identifier, such as the Burst Cut Area (BCA) is incorporated onto an electronic storage medium 22 at the time of manufacture. It should be noted that the electronic storage medium 22 may take the form of any electronic/optic storage medium capable of storing content. In the present description, however, focus will remain on one embodiment of electronic storage medium, a DVD.

As shown in FIG. 1, after the generation of the content, the electronic storage medium may be replicated by a replicator in operation 14. Further, a package tracking identifier is incorporated onto a package in which the electronic storage medium is stored. Such tracking identifiers are then stored in a database.

In use, the electronic storage medium may be tracked from a distributor to a retailer and the consumer in steps 16, 18, and 20. This tracking is enabled by using the tracking identifier on the package 22 while the electronic storage medium is shipped between various entities such as the replicator, distributor, retailer, and consumer. Furthermore, when a final user obtains the electronic storage medium, the electronic storage medium may be identified using the tracking identifier on the electronic storage medium 22. As will become apparent hereinafter, various features may be afforded by identifying the electronic storage medium.

As mentioned earlier, the electronic storage medium may be tracked by using the tracking identifier on the package while the electronic storage medium is shipped between various entities such as a replicator, distributor, retailer, and consumer. Specifically, the replicator is the company that manufactures, or "presses", the DVD. The replicator receives a DLT (digital linear tape) from the content developer (studio such as New Line) and then creates a "glass master" of the DVD based on the data on the DLT. The glass master then becomes the master DVD from which all replicated DVDs are made. The replicator adds the BCA number to each DVD as part of the replication process and then "packages/boxes" the DVDs for distribution to a distributor or retailer.

The distributor, on the other hand, is the company that packages together multiple titles together for distribution to a retailer. The value of a distributor is that they maintain direct relationships and channels with the retailers, can maintain larger inventories of products—leveraging economies of scale not possible by smaller retailers. A retailer requests multiple products from the distributor (for example 20 copies of Lost in Space, 50 copies of Ronin, and 100 copies of You've Got Mail—all of which come from different studios), then the distributor can "package" the variety of products together for distribution to the retailer.

Finally, the retailer is the company that sells product directly to consumer. Examples include "brick-and-mortar" stores such as Blockbuster Video, Hollywood Video, Best Buy, Good Guys, etc. Retailers also include online retailers such as DVDExpress, Amazon.com, and other e-commerce-oriented companies. Other groups are also joining the retailing opportunity, such as Nimbus who already offers both replication and distribution. It is the next logical step to offer direct-to-consumer online sales of product. It should be noted that the aforementioned replicator may also be the distributor (Nimbus/Technicolor, WAMO/Deluxe). Also, replicators may ship directly to retailers, especially in the case of large accounts like Blockbuster.

Example in Accordance with a Preferred Embodiment

An example setting forth details relating to the tracking of DVDs will now be set forth. First, a content owner (such as studio) requests use of the BCA on their DVDs. Based on request, the replicator (examples include WAMO, Panasonic, Nimbus, Technicolor, Pioneer, Crest) adds unique BCA number to every DVD. Adding BCA number to each DVD requires a special (YAG) laser. This may be the very last step in the manufacturing process. The BCA numbers for a specific DVD must then be entered into InterActual's BCA database. Information to track includes: DVD title, i.e. "Lost in Space"; BCA #/range, i.e. 12345687890; and Shipping Packaging/Tracking Container, i.e. Box 52221 to Hollywood Video.

After the BCA number is added to the DVDs, the DVDs are packaging/boxed for distribution to either the Distributor or the Retailer. It should be noted that many companies take multiple forms, so the replicator and distributor may be one in the same. Also, some retailers are large/important enough to get shipments directly from replicator. The way in which the DVDs are packaging/shipped is very important because one must track the BCA numbers to actual shipping containers (box, etc.). Therefore tracking information must also be added to the BCA database.

If packaged DVDs are then sent to distributor, the distributor also has mechanisms, i.e. scanners, input device, and monitoring devices, in place for tracking based on their distribution. For example, Deluxe may receive a "package" of 100,000 copies of "Lost in Space". However, the distributor ships 10,000 to Retailer A and 5,000 to Retailer B. The distributor should be able to "input" retailer A and B's distribution information into the system. Ideally, this becomes a seamless/automated process.

Once the DVDs reach the retailer (either from the replicator or distributor), then DVDs may be further divided and distributed to local stores/outlets. In such a situation, the retailer should be able to automatically "track" distribution of these DVDs through to their stores. Over time, all three entitities (replicator, distributor, and retailer) are able to add tracking information to BCA database. Due to complexity and dependencies on existing business systems, the retail tracking concept will be rolled out in phases: replicator first most likely with key retail accounts. The distributors will be brought in. Retailers will then begin to embrace the ability to track based on local outlet/store.

Utilization of BCA Identification at the End Consumer

As mentioned earlier, when a final user obtains the electronic storage medium, the electronic storage medium may be identified using the tracking identifier on the electronic storage medium. By this identification, various features may be executed upon identification of the electronic storage medium. It should be noted that, in one embodiment, identification is carried out by a computer and software governs the features that are executed after identification of the electronic storage medium.

Figure 3:
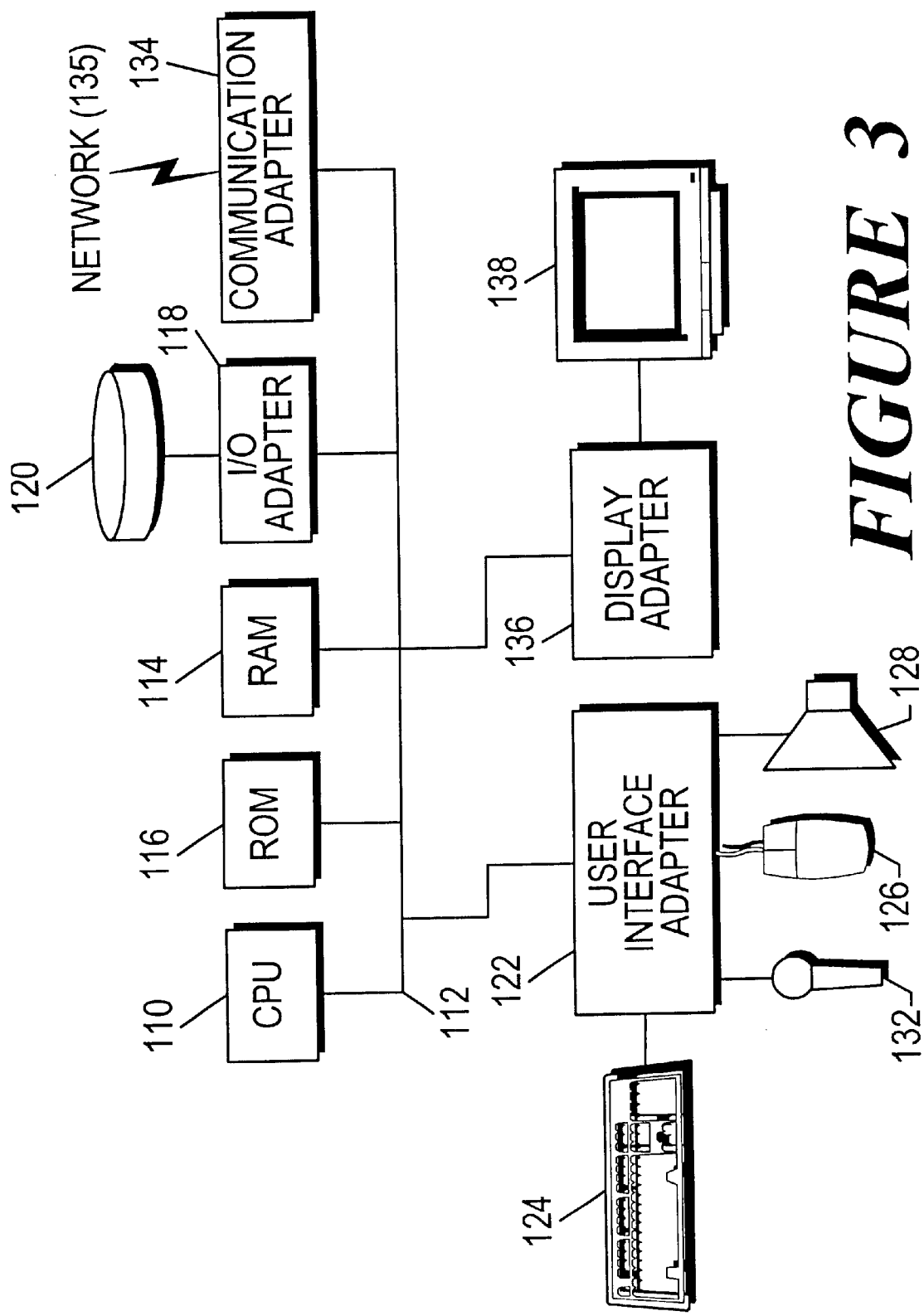
FIG. 3 is a block diagram of an embodiment of the hardware involved with one embodiment of the present invention.

For example, the present invention may be practiced in the context of a personal computer such as an IBM compatible personal computer, Apple Macintosh computer or UNIX based workstation. A representative hardware environment is depicted in FIG. 3, which illustrates a typical hardware configuration of a workstation in accordance with a preferred embodiment having a central processing unit 110, such as a microprocessor, and a number of other units interconnected via a system bus 112. The workstation shown in FIG. 3 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network (e.g., a data processing network) and a display adapter 136 for connecting the bus 112 to a display device 138. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, our logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language—2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the WorldWide Web global information initiative since 1990. HTML is an application of ISO Standard 8879; 1986 Information Processing Text and Office Systems—Standard Generalized Markup Language (SGML).

To date, Web development tools have been limited in their ability to create dynamic Web applications that span from client to server and interoperate with existing computing resources. Until recently, HTML has been the dominant technology used in development of Web-based solutions. However, HTML has proven to be inadequate in the following areas:

Poor performance;
Restricted user interface capabilities;
Can only produce static Web pages;
Lack of interoperability with existing applications and data; and
Inability to scale.

Sun Microsystem's Java language solves many of the client-side problems by:

Improving performance on the client side;
Enabling the creation of dynamic, real-time Web applications; and
Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

System Software in Accordance With a Preferred Embodiment

When a consumer purchases DVD at local store, or purchases online through online retailer a new DVD is available for consumer use. The consumer places the DVD in a computer and the DVD initiates an online session between the user and an Internet server application in tight communication with the DVD in the DVD-ROM drive. Three BCA usage cases include:

(1) a consumer launches a browser and goes to a web site that utilizes the BCA information to look up information in a database. The database is also updated with information gleaned from the current user and their demographics.

(2) a local application (like PCFriendly) automatically connects to Internet and to a web server that looks up and/or acts on BCA information, or (3) a local application like PCFriendly utilizes information already contained in the BCA number and tailors experience locally based on this information.

The details associated with the various cases will be discussed. Case 1: go to web site that looks up BCA. With a DVD in their drive, consumer connects to a special web site that has an agent/component embedded on the web page that can read the BCA information. This embedded component reads the BCA, along with other potential information (user id, etc.), passes this information to the web server. The web server then tailors a response to the consumer based on pre-defined conditions/marketing/profile.

Case 2: local application (like PCFriendly client software) automatically connects to a web server (without manual intervention of consumer) and passes BCA information to the web server. Based on the BCA number and other potential information, the web server passes information to the consumer's client software or presents remote Internet-based information based on this information/profile/retailer/ etc.

Case 3: location application (like PCFriendly) reads BCA information and acts upon predefined information in the BCA number itself. This case does not necessarily require an Internet connection. The BCA is obtained utilizing ASPI code to read the 188 bytes of information.

Examples of Cases:

Case 1: ActiveX control is designed using C++ and embedded in HTML page (using standard OBJECT definition in HTML). When the web page is loaded, so is the ActiveX control. Upon a grant of permission by a consumer, the ActiveX control accesses the DVD-ROM drive, obtains BCA data, and any other pertinent information. The ActiveX control then "posts" this information to the web server using HTTP or FTP POST methods. The web server automatically reads and parses the POST information, and acts upon this information (for example, by sending the consumer to a unique URL that is only accessible if the correct DVD with the correct BCA is in the DVD-ROM drive).

Case 2: Local C++ application (PCFriendly) utilizes a remote agent technology developed by InterActual. The remote agent technology automatically connects to the remote web server (without consumer interaction) and passes the web server the BCA number with any other pertinent information. The remote agent also supports HTTP or FTP POST methods. The web server automatically reads and parses the POST information, and acts upon this information.

Examples Include:

Consumer request to purchase a specific product is automatically routed to the retailer from which the original DVD was purchased. In support of this example, a virtual POP/ MDF display and information is downloaded (or unlocked) locally and presented to consumer.

Case 3: Local C++ application or activeX controls in a local web page access the BCA information on the DVD.

Based on this information, the local application acts upon this information. (In this mode, the information contains in the BCA field must have sufficient information for local application to act upon).

The current system involves an online database that provides a real-time lookup based on the BCA. The resulting lookup in the database can retrieve information specific to the application such as a consumer profile, retailer and support location and piracy information.

USAGES OF BCA INFORMATION
Retail Distribution

Figure 2:
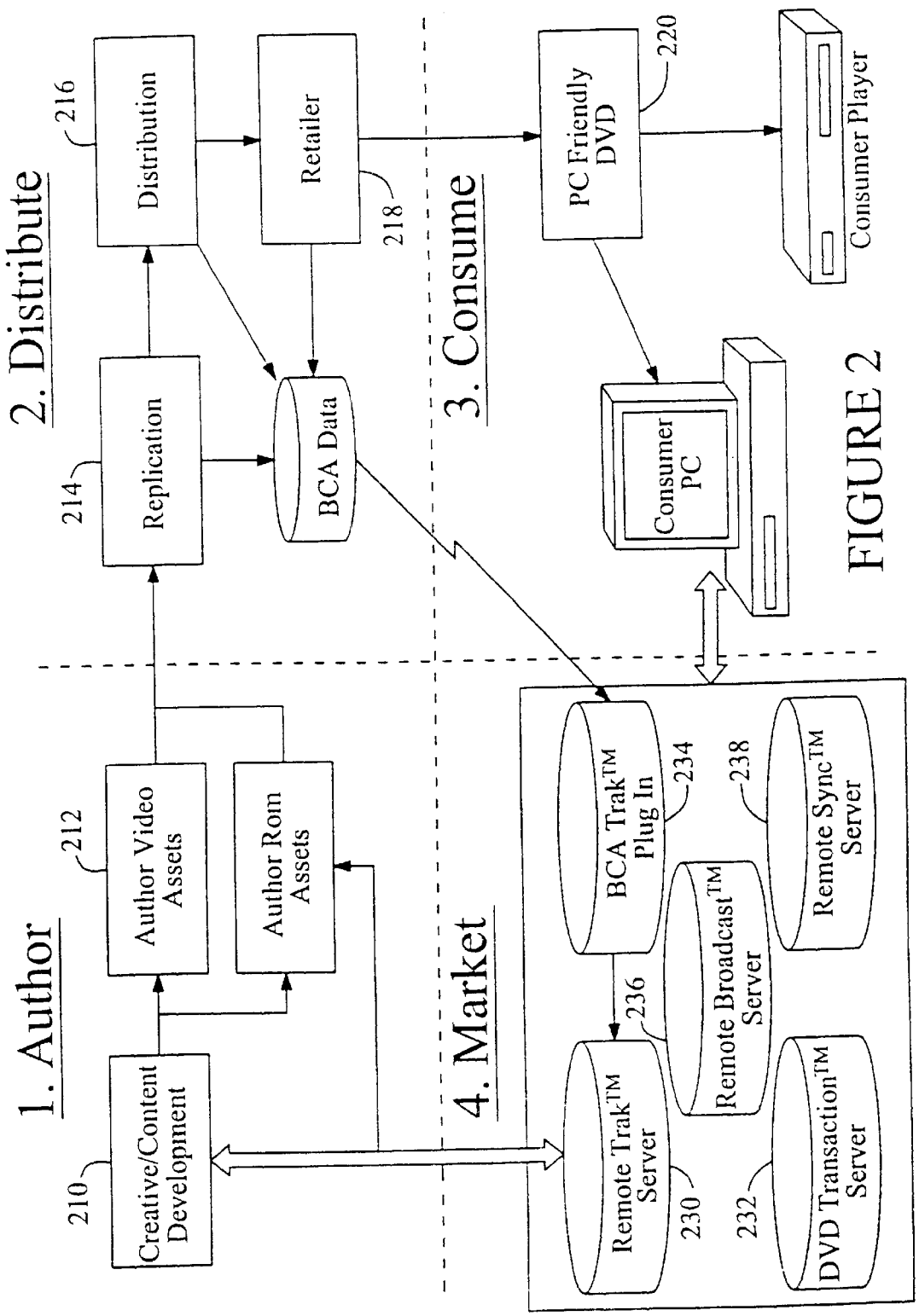
FIG. 2 is a detailed block diagram of the method of tracking the electronic medium in accordance with a preferred embodiment.

When a remote agent connects to a server with BCA information, the server performs a real-time lookup on the BCA number and determines the replicator, distributor, and/or retailer for the passed BCA number. This information can then be used for various projects, such as Updating or changing channel/banner/programming in PCFriendly software. FIG. 2 depicts this operation as a RemoteSync 238. Unlock specific assets such as HTML, video, graphics and others which are depicted in function block Unlock Server 230. Play different assets or portion of video based on BCA information as shown in function block Unlock Server 230. The application also downloads new content based on the BCA information RemoteSync 238.

The BCA information can also be utilized to direct e-commerce transactions or "buy-me" buttons to an appropriate retailer utilizing the RemoteTrak/BCATrak function 234.

An application in accordance with a preferred embodiment can also broadcast new information/updates as shown in the Broadcast Server function block 236. Logic is also provided to unlock and/or control access to specific web sites based on BCA information as shown in the RemoteTrak Server function block 230. This logic provides consumer redirect to specific "storefront" of a retailer.

Track Individual Retail Store Performance

Specific retail store performance and consumer online usage associated with specific retailers can be tracked utilizing information based on the BCA number. This provides a local retailer with information to determine the most successful opportunities to get users online. Information such as a virtual Point of Purchase (POP) and Marketing Development Fund (MDF) utilize the BCA information and the RemoteTrak Server function 230 to track and attract consumers.

Discount coupons and the like (e.g., "cents off" coupons, rebate coupons, special offer coupons, or the like, collectively referred to herein as "coupons") have become an integral part of marketing strategies for many products, particularly retail consumer goods, sundries, foodstuffs, hardware, clothing, and the like, typically sold at local grocery, drug, and discount stores. Product manufacturers have come to rely upon coupons, rebate and gift certificates or the like to promote new and existing products, boost sales, and obtain demographic information concerning consumer buying patterns. Consumers have come to rely upon coupons or certificates as a technique for reducing costs.

Prior art couponing techniques have had several disadvantages, not the least of which are low response rate and fraud. In the prior art, coupons may be distributed using direct mailing techniques, printed in newspapers, magazines, or the like, distributed with other commercial goods (e.g., laundry soap coupon packaged with washing machine), or distributed (e.g., by original equipment manufacturers or OEMs) with the same or like goods, computers or the like (e.g., "cents off toward next purchase). Such techniques require massive amounts of printing and distribution, and historically have a low response rate (e.g., typically less than 2% of coupons distributed are redeemed). Thus, such mass-distribution techniques may not be cost effective, and are not environmentally friendly, due to the large amount of paper wasted.

Such low response rates may be due in part to the difficulty a consumer may have in maintaining, cataloging, and finding appropriate coupons before shopping. A particular consumer may have at his or her disposal only those coupons that have been sent to him or her and have been retained by the consumer. Moreover, since many coupons have expiration dates, a consumer may have to carefully catalog each coupon to insure that it is redeemed before such an expiration date occurs. Such techniques are time-consuming and cumbersome. Generally, only those consumers on a budget or those who use couponing as a hobby have sufficient time to maximize their use of available coupons. Busier and more affluent consumers may not believe that such coupon management techniques are cost effective. This latter group of consumers may represent a more desirable demographic for a product manufacturer to attract or track.

With the advent of double or even triple redemption couponing promotions provided by some retail stores (e.g., grocery store chain or the like) as well as generous cash rebate coupon promotions (i.e., gift certificates or the like), fraud had become an every increasing problem in coupon marketing. Color photocopiers may create coupons that are indistinguishable from originals. Unscrupulous consumers may use such copied coupons to purchase large numbers of items at reduced prices or fraudulently obtain rebates for products which were never purchased.

Moreover, some unscrupulous retailer may conspire with coupon brokers to redeem large numbers of illicitly obtained or generated to defraud manufacturers.

As coupon discounts or rebates may be used for promotional purposes, the resulting net price to the consumer with such a discount may be less than the product manufacturer's wholesale price. A product manufacturer may offer such steep discounts in the hope of obtaining future sales at full retail prices. If a consumer uses a photocopied coupon for multiple purchases of a retail item, the product manufacturer may not obtain the desired repeat sales at full retail price, and the entire scheme of couponing may be defeated.

In addition, prior art couponing techniques have yielded little, if any, useful data to product manufacturers regarding who is redeeming such coupons. Consumer demographic data is invaluable to a product manufacturer in determining which products to target to particular consumer groups (e.g., through particular advertising venues). Moreover, such demographic data may be used to more efficiently distribute future coupons. In addition, information as to the buying habits (i.e., recency, frequency, and monetary value or RFM) and demographics of particular consumers or groups of consumers have a market value and such information may be sold or traded for a profit.

Figure 6:
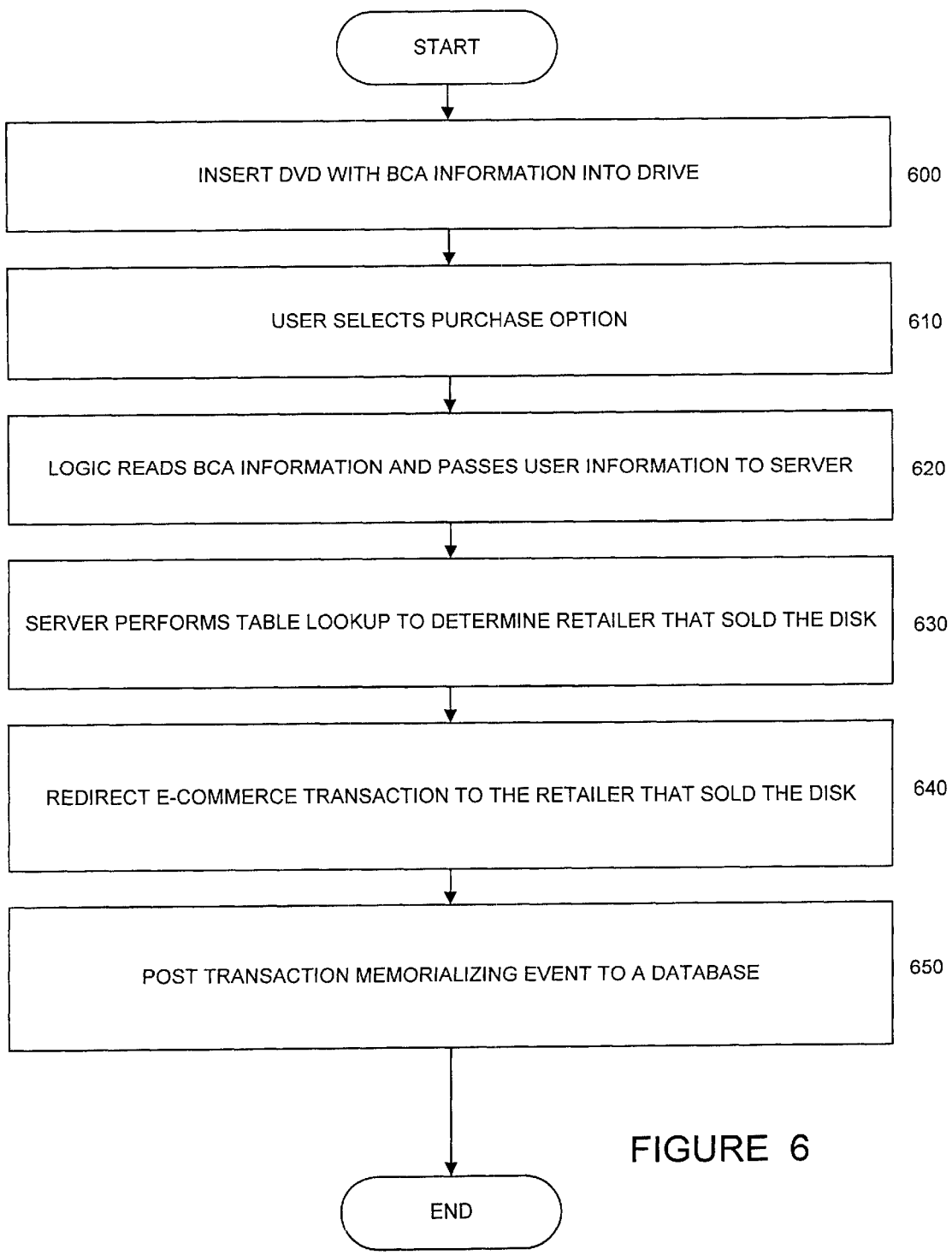
FIG. 6 is a flowchart of a redirect operation for an electronic commerce transaction in accordance with a preferred embodiment.

Various techniques have been tried to eliminate or reduce fraud, provide more convenient techniques for distributing coupons, and to better track consumer demographic data. De Lapa et al., U.S. Pat. No. 5,353,218 discloses a focused coupon system. FIG. 6 of De Lapa et al. is most illustrative. De Lapa et al. discloses a system for distributing coupons with a machine readable code (barcode) containing both customer and coupon identifications. The consumer code may be replaced with a generic code used in a look-up table for coupon verification and information. The entire machine-readable code may be captured and uploaded to a central database for determining coupon and consumer identification. The uploaded information may be used for marketing purposes (to determine which coupons to next send to the consumer) and/or for rebate purposes.

Although the system of De Lapa et al. attempts to provide a more focused distribution technique, the system still relies upon paper coupons being distributed to consumers. Consumers may throw out such mass mailings (i.e., "junk mail") without opening them. Moreover, the system relies upon the consumer supplying demographic information in a questionnaire or the like in order to be provided with the coupons. Moreover, since the coupons of De Lapa et al. are preprinted, coupon trading or copying may be more prevalent.

Furthermore, in De Lapa et al., no mechanism is present for capturing subsequent demographic information. In addition, as consumer data is captured at the store level, an additional mechanism may be required to upload such consumer information to a centralized database to capture consumer demographic information. Additional data processing hardware/software may be required at a retail store in order to process such data. Thus, retailers may be initially reluctant to invest in such a scheme.

In retailing, it may be essential to check out consumers in as little time as possible. Thus, if additional processing time is required during customer checkout to process the coupons of De Lapa et al. retailers may be less likely to accept adopt such technologies.

Moreover, under the scheme of De Lapa et al., there is no mechanism provided to insure that the individual who receives the coupons is the targeted individual. If a consumer moves to a new address, new occupants at the old address may receive and redeem coupons addressed to the consumer. Thus, target tracking data may be inaccurate or incomplete.

Murphy, U.S. Pat. No. 5,305,195, issued Apr. 19, 1994, discloses an interactive advertising system for on-line terminals. A series of remote terminals receive compressed and encoded video advertising signals that may be stored on an internal hard drive. The advertising videos are played, and a consumer may select products using the terminal. In FIG. 4, (Col. 7, lines 45–50) Murphy discloses that a printer may be provided for printing selected coupons.

The apparatus of Murphy may solve some of the problems associated with distributing coupons in paper form. However, The Murphy system appears to be more concerned with directing advertising information than collecting demographic information or distributing coupons. Thus, it does not appear that the apparatus of Murphy is equipped to process demographic information or reduce coupon fraud. Moreover, Murphy discloses his apparatus for use in college campuses, a limited and narrow consumer demographic.

Von Kohorn, U.S. Pat. No. 5,128,752, issued Jul. 7, 1992 discloses a system and method for generating and redeeming tokens selected from television data. Product information and authentication data may be transmitted and displayed on a television and a home printer. A viewer may select a coupon for printing and redeem the coupon at a retail store. Von Kohorn does disclose a technique for reducing fraud (Col. 7, lines 16–38). However, it appears that these techniques require action at the retail level to verify that a coupon is indeed legitimate, including, in one embodiment, requesting identification credentials from the consumer. Such techniques may be intrusive and cumbersome to use in a retail establishment where a number of coupons may be redeemed at any given time.

Moreover, it does not appear in the system of Von Kohom, which relies on broadcasting, does not target specific consumers with particular coupons. Rather, it appears that the coupons are distributed to all viewers equipped with the appropriate apparatus. Note that in FIG. 6 (Col. 9, lines 40–48) Von Kohom discloses a technique for recording marketing data from consumer information encoded into the coupon.

Axler et al., U.S. Pat. No. 5,305,197, issued Apr. 19, 1994, discloses a coupon-dispensing machine with feedback. A consumer kiosk is placed in a retail establishment or the like to display advertising (LED scroll) and allow customers to print out selected coupons. A proximity sensor detects the presence of customers near the apparatus.

The Axler device may solve some of the problems associated with paper distribution of coupons. However, it does not appear that the Axler device may retrieve any significant amount of consumer demographic data other than the number and type of coupons printed. Moreover, within the in-store environment, it may be difficult to enter such consumer data, particularly with the keypad disclosed by Axler. Thus, it does not appear that the Axler device may be suitably adapted to retrieve consumer demographic data.

A fundamental fault with the Axler device is that it does not appear to target or prior motivates customers with to visit a retailer with specific coupons. Rather, the in-store location of the Axler device may facilitate a consumer "targeting" a coupon. In other words, a consumer may make a number of product selections in a store and then visit the coupon kiosk of Axler to determine whether any purchases are subject to coupon discount or rebate. Thus, the fundamental goal of couponing--to motivate a consumer to purchase a product--may be compromised.

In addition, the kiosk of Axler may occupy valuable commercial retail space. In a retail store (e.g., supermarket or the like) even a few feet of shelving may be extremely valuable for displaying and containing retail merchandise. Product manufacturers may even pay "rent" to a retail establishment in the form of rebates or promotional fees in order to obtain prominent shelf space. Thus, a retail establishment may be loath to give up such valuable space to a couponing kiosk. Moreover, it may be time consuming and frustrating for customers waiting in line to access the kiosk. Providing additional kiosks may be cost-prohibitive.

Support Services in Accordance with a Preferred Embodiment

To provide enhanced support for DVD in a commercial environment, the BCA is utilized to redirect to a specific support site based on table lookup utilizing the BCA number as shown in FIG. 2 at function block 234 RemoteTrak/ BCATrak Server function block. Logic is also provided to track disc anomalies and defects from manufacturing process as shown in function block 234 RemoteTrak/BCATrak Server. Other logic is also provided to track retailer-specific support issues as shown in function block 234 RemoteTrak/ BCATrak Server, to track geographical support issues as shown in function block 234 RemoteTrak/BCATrak Server, to restrict access to support sites based on BCA information as shown in function block RemoteTrak/BCATrak Server 234. Finally, enhanced support is provided for broadcast updates utilizing support and drivers based on BCA information as shown at function block 236 Broadcast Server.

Security in Accordance with a Preferred Embodiment

The BCA information can also be combined with game unlocking logic to provide an authorized user with unlocked video based on BCA information as shown at function block 238 DVDUnlock Server. BCA information has a unique identifier which, when combined with other data, can track when a movie and/or a game was given to a friend which will trigger another transaction for payment or other information as shown in function block 234 RemoteTrak/BCATrak Server. This information can also be used to track pirated DVDs, and report the information back to the retailer as shown in function block 230

RemoteTrak/BCATrak Server, back to a manufacturer as shown in function block 230 RemoteTrak/BCATrak Server and back to a distributor as shown in function block 230 RemoteTrak/BCATrak Server.

This capability provides the ability to localize pirated discs to a specific region/retailer as shown in function block 230 RemoteTrak/BCATrak Server and track illegal region code use and potentially trace back to retailer/distributor as shown in function block 230 RemoteTrak/BCATrak Server.

General/Advertising Logic in Accordance with a Preferred Embodiment

Logic is also provided to tailor video based information as part of the BCA (play video 1 for one demographic, play video 2 for another as shown in finction block 238 DVDUnlock Server, RemoteSync, and to tailor internet/browser experience based on BCA information as shown in function block 238 RemoteTrak/BCATrak Server. Targeted advertising is also provided based on BCA information and content can be tailored for channel/banner/programming within PCFriendly software) based on consumer profile which is associated with BCA as shown in function block 238 RemoteSync.

Figure 5:
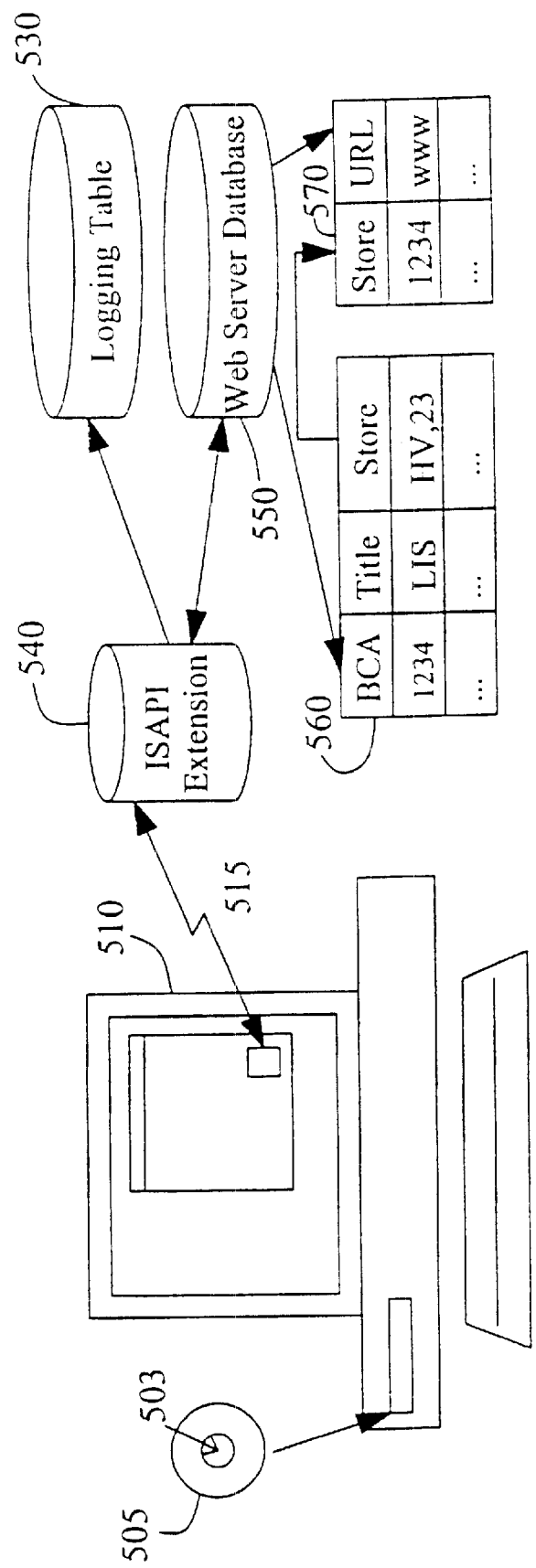
FIG. 5 is a block diagram of a user experience in accordance with a preferred embodiment.

FIG. 5 is a block diagram of a user experience in accordance with a preferred embodiment. The BCA number 503 is burned/added onto DVD 505. When the DVD is placed into a consumer's computer 510, InterActual's software automatically reads the BCA number and passes this information to the web server. The BCA information is passed to the web server, running an ISAPI extension 540, using either HTTP or FTP protocol 515. The information can be passed from a local "client" application, or an applet or ActiveX-type control can be downloaded from a web site that passed this information to the web server. The information is currently passed using an HTTP POST command using the syntax shown below.

http://www.pcfriendly.com/scripts/RemoteAgentUpgrade.DLL&bca=1234568790?userid=12 34568790?...

The current implementation of the web server is an ISAPI extension written in Visual C++ and is currently named RemoteAgentUpgrade.DLL for use with Microsoft Windows NT. Upon receiving the POST command, the ISAPI extension parses the information in the POST command to determine the BCA number and other associated information (such as user ID, etc.). This information is then logged in the web server log table 530, and is used to query specific information in the web server database 550 based on the POST. This flexible database structure enables a variety of uses of the BCA number.

A retailer example in accordance with a preferred embodiment is presented to assist one of ordinary skill in the art to make and use the invention without undue experimentation. A consumer inserts a DVD into their DVD-ROM drive. The consumer is presented with an HTML page with a "Buy-Me" button. Upon clicking the Buy-Me button, the consumer is connected to the Internet to a specific web page that includes an ActiveX control. The ActiveX control automatically connects to the ISAPI extension with BCA information for the currently inserted DVD. The ActiveX control also informs the ISAPI extension that the consumer is attempting an e-commerce transaction. The ISAPI extension parses the information from the POST command, and connects to the web server database. Since the ActiveX control informed the ISAPI extension that an e-commerce transaction is being attempted, the ISAPI extension connects to the web server database to determine the retailer from which the DVD was originally purchased. This can be determined because a web server database contains a BCA lookup table 560 with three fields:

| BCA Number | #123458790 |
|---|---|
| DVD Title Name | Lost In Space |
| Retailer/Store | Hollywood Video, Store #23 |

Using the Retailer/Store information, the appropriate e-commerce URL can be determined from Retailer table 570 that contains information specific for that Retailer:

| Retailer/Store | Hollywood Video, Store #23 |
|---|---|
| E-Commerce URL | http://www.retailer23.com/... |

FIG. 6 is a flowchart of a redirect operation for an electronic commerce transaction utilizing BCA information for intelligent processing in accordance with a preferred embodiment. Processing commences at 600 when a user inserts a DVD into a player and the electronic commerce operation is initiated by a user action as shown in function block 610. When the user selects the purchase option at 610, logic is initiated to read the BCA information and this information is combined with other user information from the server database as shown in function block 620. Then the server performs a table lookup to ascertain the retailer that sold the original DVD as shown in function block 630. The original retailer becomes the target for the purchase that the user initiated in function block 610, and the e-commerce transaction is re-routed to the retailer that sold the disk as shown in function block 640. Finally, a transaction is posted to the server database that memorializes the events associated with the re-direct operation.

Figure 7B:
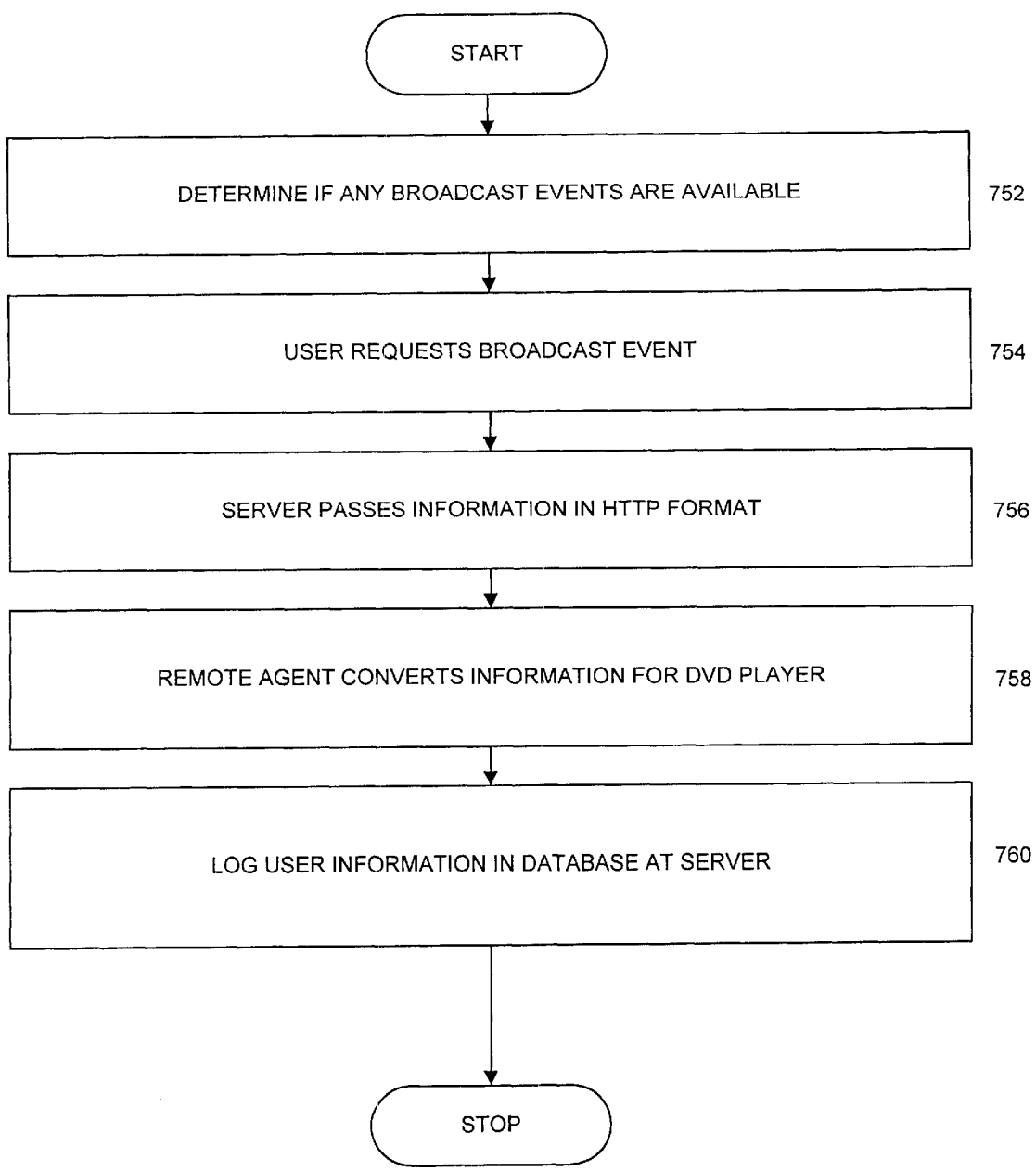

FIGS. 7A and 7B are flowcharts setting forth the detailed logic associated with user connection and update for DVD processing in accordance with a preferred embodiment. Processing commences when a user connects to the Internet with a DVD application active as illustrated in function block 700. The remote agent detects the live internet connection and connects the application to a server for further processing as shown in function block 710. Then, the server connects the application with the appropriate version identification and upgrades the remote application if an upgraded version is available without further input from the user as shown in function block 720. If the user is a first time user, then the server obtains user information from the user utilizing, for example data from the DVD, or a query operation as shown in function block 730. Then, the application collects current DVD usage information and logs the information to a database as shown in function block 740. Finally, the current DVD information is transmitted to the user as shown in function block 750. Processing is then transferred to function block 752 of FIG. 7B where the application determines if any broadcast events are available. Then, in function block 754, if a user requests broadcast events, then the server passes the information to the user in HTTP format as shown in function block 756. The remote agent receives the information from the server and coverts the information for the particular DVD player as shown in function block 758, and ultimately logs user information in a database at the server as shown in function block 760.

General Advertising Flows

Figure 8:
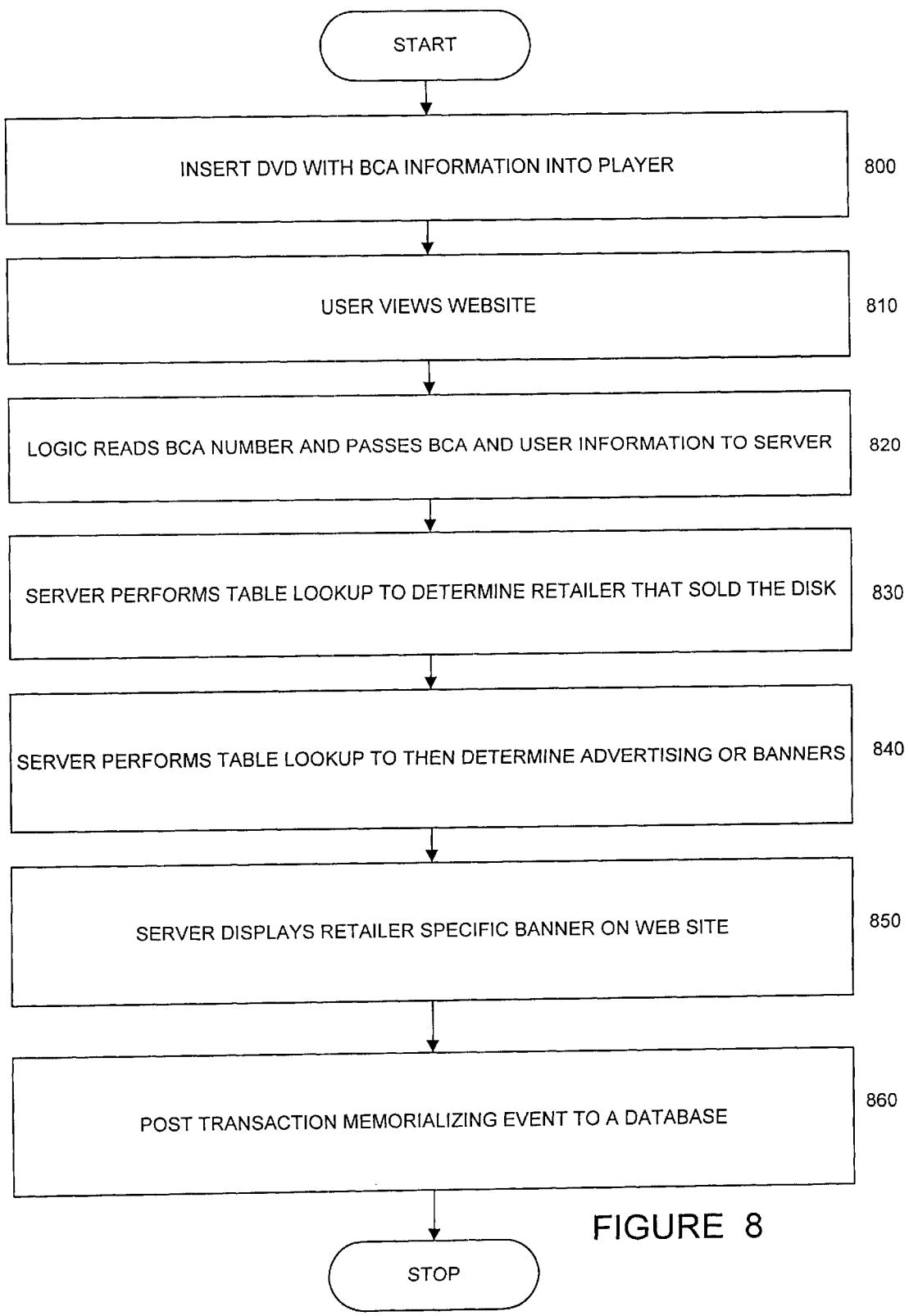
FIG. 8 presents logic demonstrating the display of specific advertising information based on a retailer/distributor utilizing BCA information for intelligent processing in accordance with a preferred embodiment.

FIG. 8 is a flowchart setting forth the detailed logic for general advertising services in accordance with a preferred embodiment. The flowchart illustrates the detailed logic associated with presenting advertising (such as a banner) customized for a particular distributor/retailer/etc.

FIG. 8 presents logic demonstrating the display of specific advertising information based on a retailer/distributor utilizing BCA information for intelligent processing in accordance with a preferred embodiment. Processing commences at 800 when a user inserts a DVD with BCA information into a player, and the advertising operation is initiated by a user action as shown in function block 810. When a user connects to a web page on the Internet at 810, logic is initiated to read the BCA information and this information is combined with other user information from the server database as shown in function block 820. Then the server performs a table lookup to ascertain the retailer that sold the original DVD as shown in function block 830. Once the original retailer is ascertained, the server performs another table lookup to determine the advertising banner as shown in function block 840. The advertising banner associated with original retailer is then displayed in the web site 810 as shown in function block 850. Finally a transaction is posted to the server database that memorializes the events associated with the advertising operation 860.

Distributors, retailers, computer or other hardware manufacturers, direct sales people, content developers or anyone who distributes, sells, or gives away DVDs will all receive benefits as detailed below in accordance with a preferred embodiment. Some of these include for example:

Blockbuster, DVDExpress, Amazon.com, Best Buy, Deluxe, Technicolor/Ninbusl, IBM, Gateway, Dell, Creative Labs, New Line, Warner, Activision, Electronic Arts, General Motors and Ford Motor Company.

Figure 9:
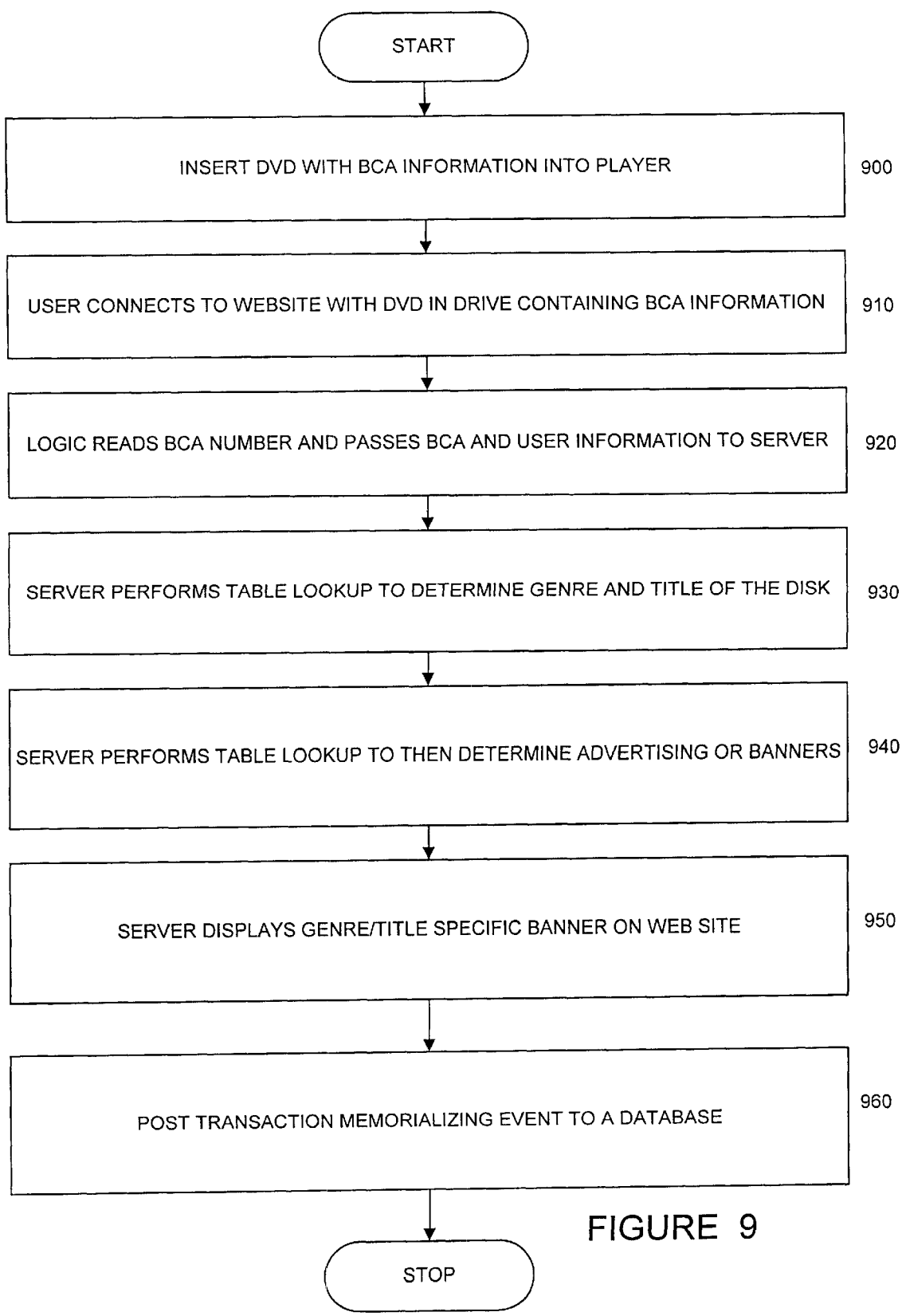
FIG. 9 is a flowchart demonstrating the display of specific advertising information based on genre/type of DVD utilizing BCA information for intelligent processing in accordance with a preferred embodiment.

FIG. 9 is a flowchart demonstrating the display of specific advertising information based on genre/type of DVD utilizing BCA information for intelligent processing in accordance with a preferred embodiment. Processing commences at 900 when a user inserts a DVD with BCA information into a player, and the advertising operation is initiated by a user action as shown in function block 910. When the user connects to web page on the Internet at 910, logic is initiated to read the BCA information and this information is combined with other user information from the server database as shown in function block 920. Then the server performs a table lookup to ascertain the title and genre of the DVD as shown in function block 930. Once the title and genre is ascertained, the server performs another table lookup to determine the advertising banner as shown in function block 940. The advertising banner associated with the title and genre of the DVD is then displayed in the web site 910 as shown in function block 950. Finally a transaction is posted to the server database that memorializes the events associated with the advertising operation 960.

Figure 10:
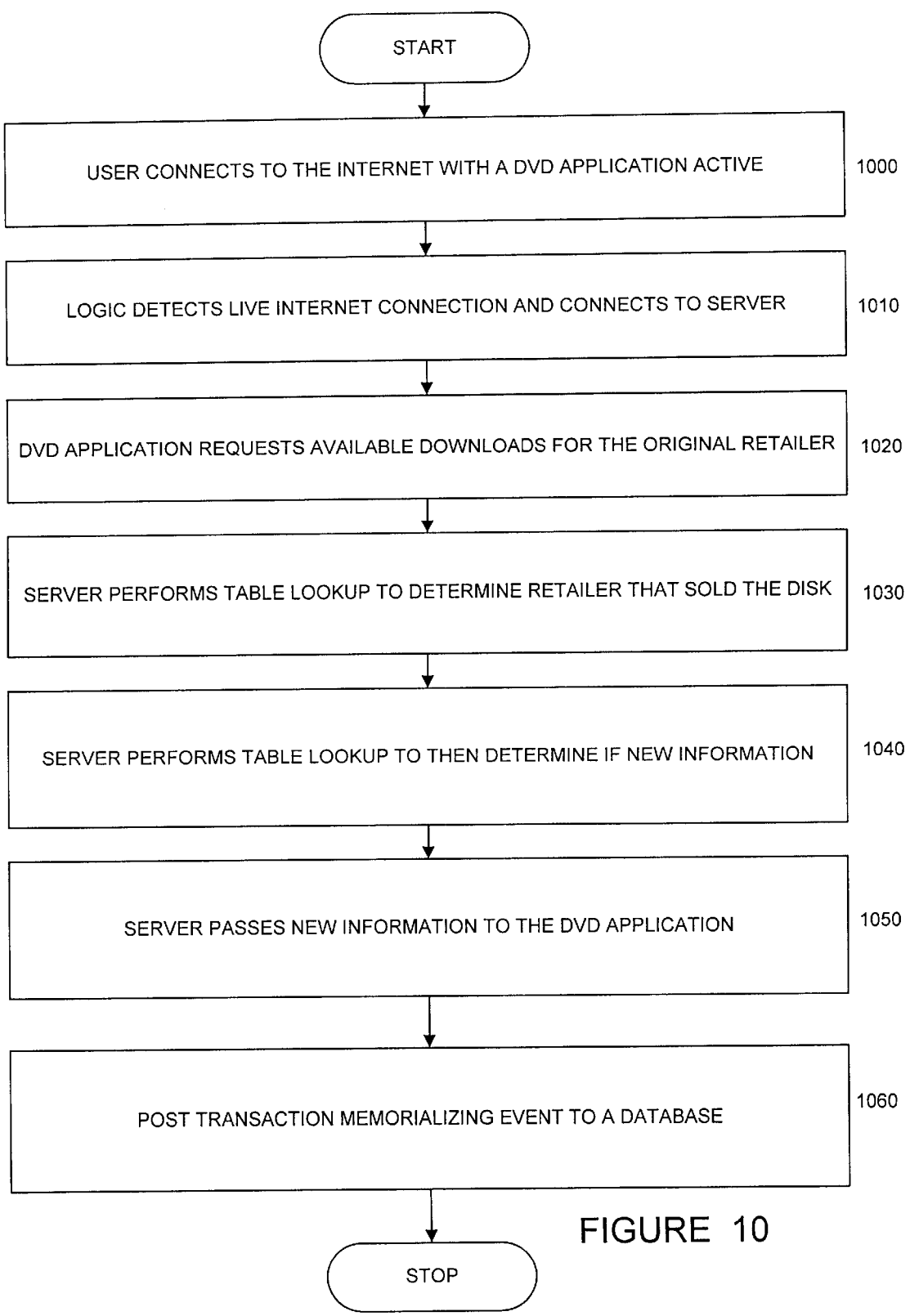
FIG. 10 is a flowchart of a download operation for downloading and updating retailer-specific information of the DVD utilizing BCA information for intelligent processing in accordance with a preferred embodiment.

FIG. 10 is a flowchart of a download operation for downloading and updating retailer-specific information of the DVD utilizing BCA information for intelligent processing in accordance with a preferred embodiment. Processing commences at 1000 when a user connects to the Internet with a DVD application active. Logic detects a live Internet connection, reads the BCA information, and initiates a connection to the server as shown in function block 1010. After logic initiates the connection to the server in 1010, the DVD application requests all available downloads from the server for the retailer of the currently inserted DVD, as shown in function block 1020. The server performs a table lookup to ascertain the retailer that sold the original DVD as shown in function block 1030. Then the server performs another table lookup to determine the download information as shown in function block 1040. Once the download information is determined for the request initiated by the application in function block 1020, the server passes the download information to the application using HTTP protocal as shown in function block 1050. Finally a transaction is posted to the server database that memorializes the events associated with the download operation 1060.

Figure 11:
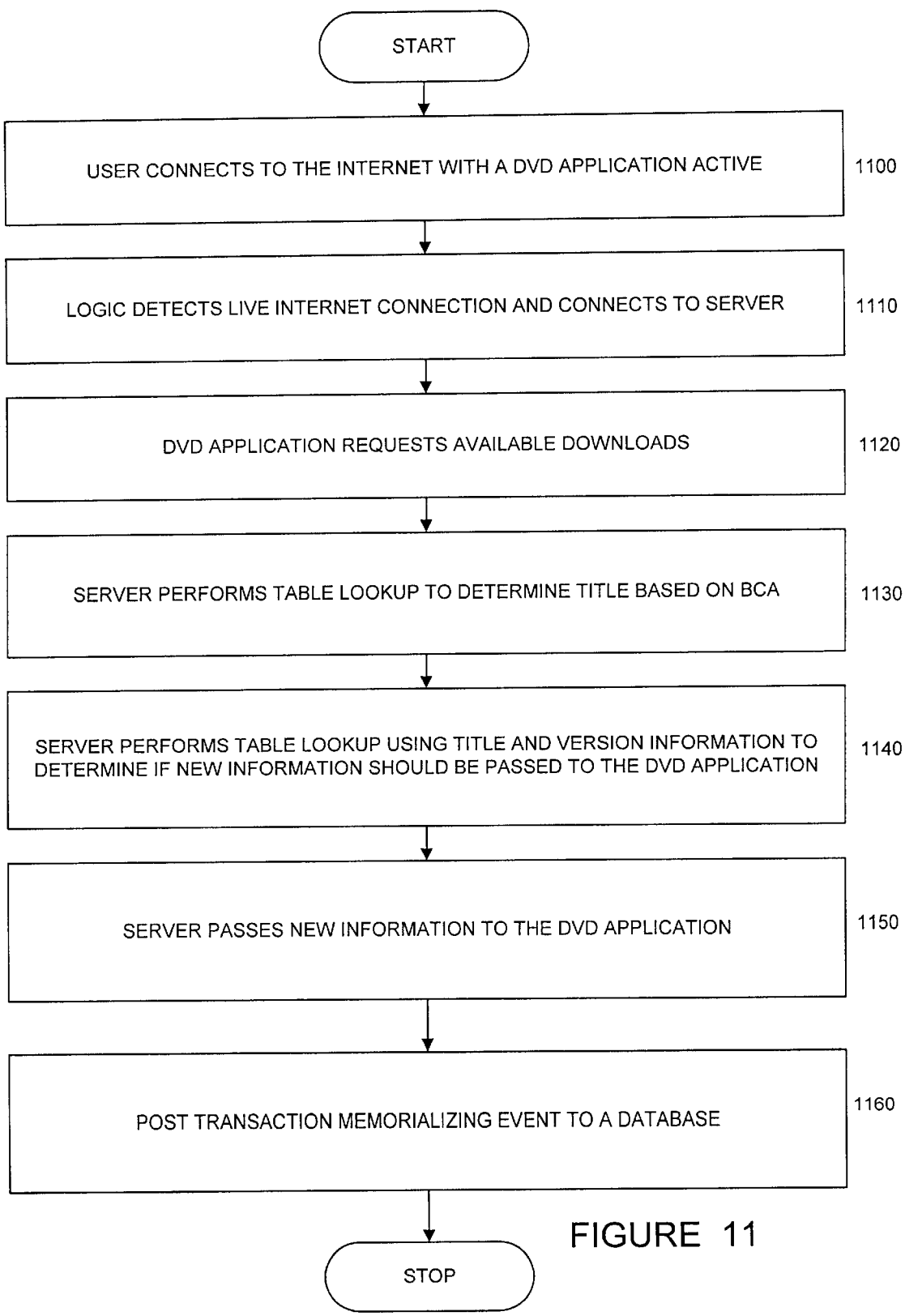
FIG. 11 is a flowchart of a download operation for downloading and updating DVD title-specific information utilizing BCA information for intelligent processing in accordance with a preferred embodiment.

FIG. 11 is a flowchart of a download operation for downloading and updating DVD title-specific information utilizing BCA information for intelligent processing in accordance with a preferred embodiment. Processing commences at 1100 when a user connects to the Internet with a DVD application active. Logic detects a live Internet connection, reads the BCA information, determines DVD application version information, and initiates a connection to the server as shown in function block 1110. After logic initiates the connection to the server in 1110, the DVD application requests all available downloads from the server for the currently inserted DVD title, as shown in function block 1120. The server performs a table lookup to ascertain the DVD title as shown in function block 1130. Then the server performs another table lookup to determine the download information as shown in function block 1140. Once the download information is determined for the request initiated by the application in function block 1120, the server passes the download information to the application using HTTP protocal as shown in function block 1150. Finally a transaction is posted to the server database that memorializes the events associated with the download operation 1160.

Figure 12:
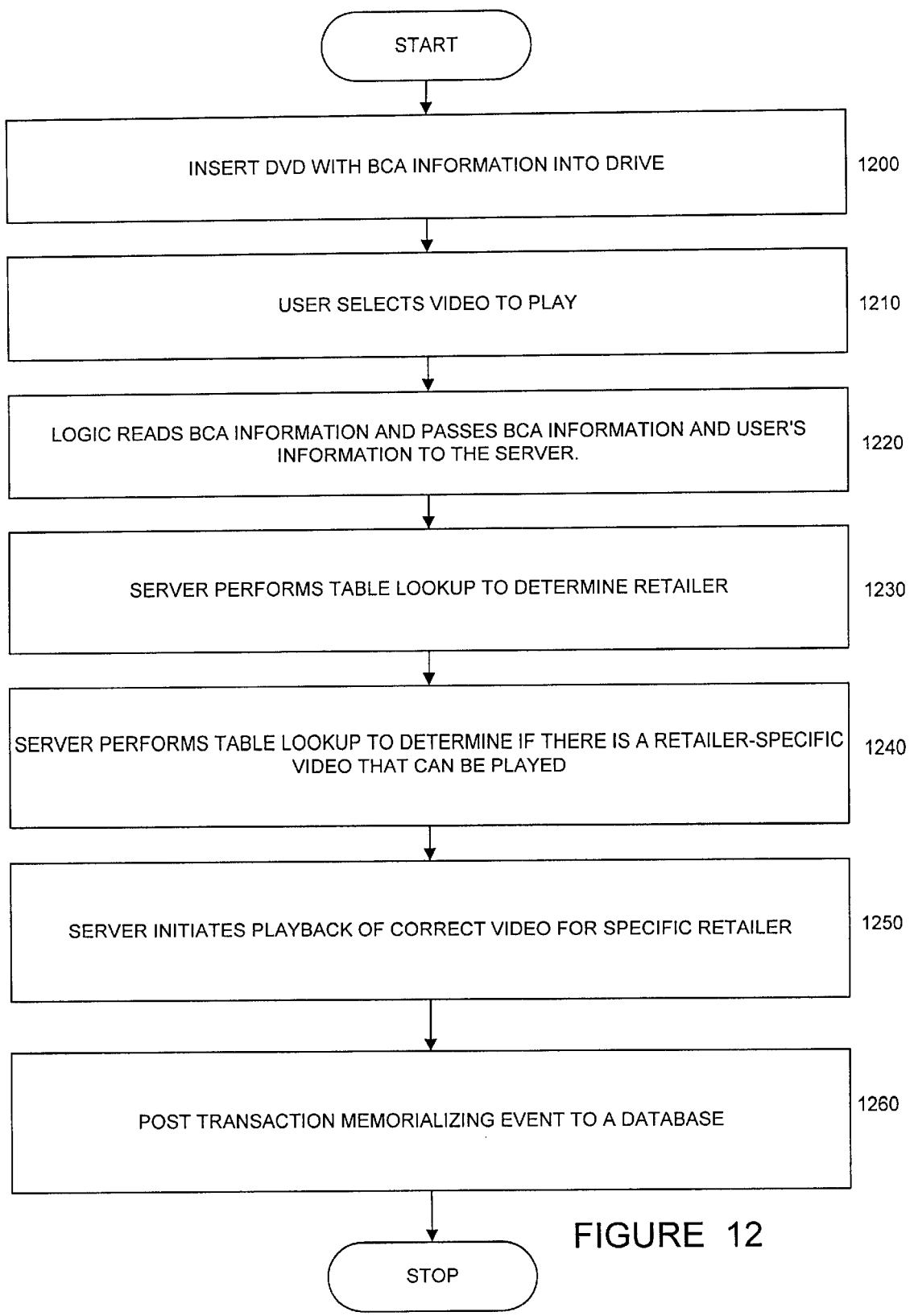
FIG. 12 is a flowchart of a tailored video viewing operation utilizing BCA information for intelligent processing in accordance with a preferred embodiment.

FIG. 12 is a flowchart of a tailored video viewing operation utilizing BCA information for intelligent processing in accordance with a preferred embodiment. Processing commences at 1200 when a user inserts a DVD into a player and video playback is initiated by a user action as shown in function block 1210. When the user selects the play video option at 1210, logic is initiated to read the BCA information and this information is combined with other user information from the server database as shown in function block 1220. The server performs a table lookup to ascertain the retailer that sold the original DVD as shown in function block 1230. Then the server performs another table lookup to determine the correct retailer video to play as shown in function block 1240. Once the retailer video information is determined for the request initiated by the application in function block 1210, the server initiates playback of the correct video for the retailer that sold the disk as shown in function block 1250. Finally a transaction is posted to the server database that memorializes the events associated with the video viewing operation operation 1260.

Figure 13:
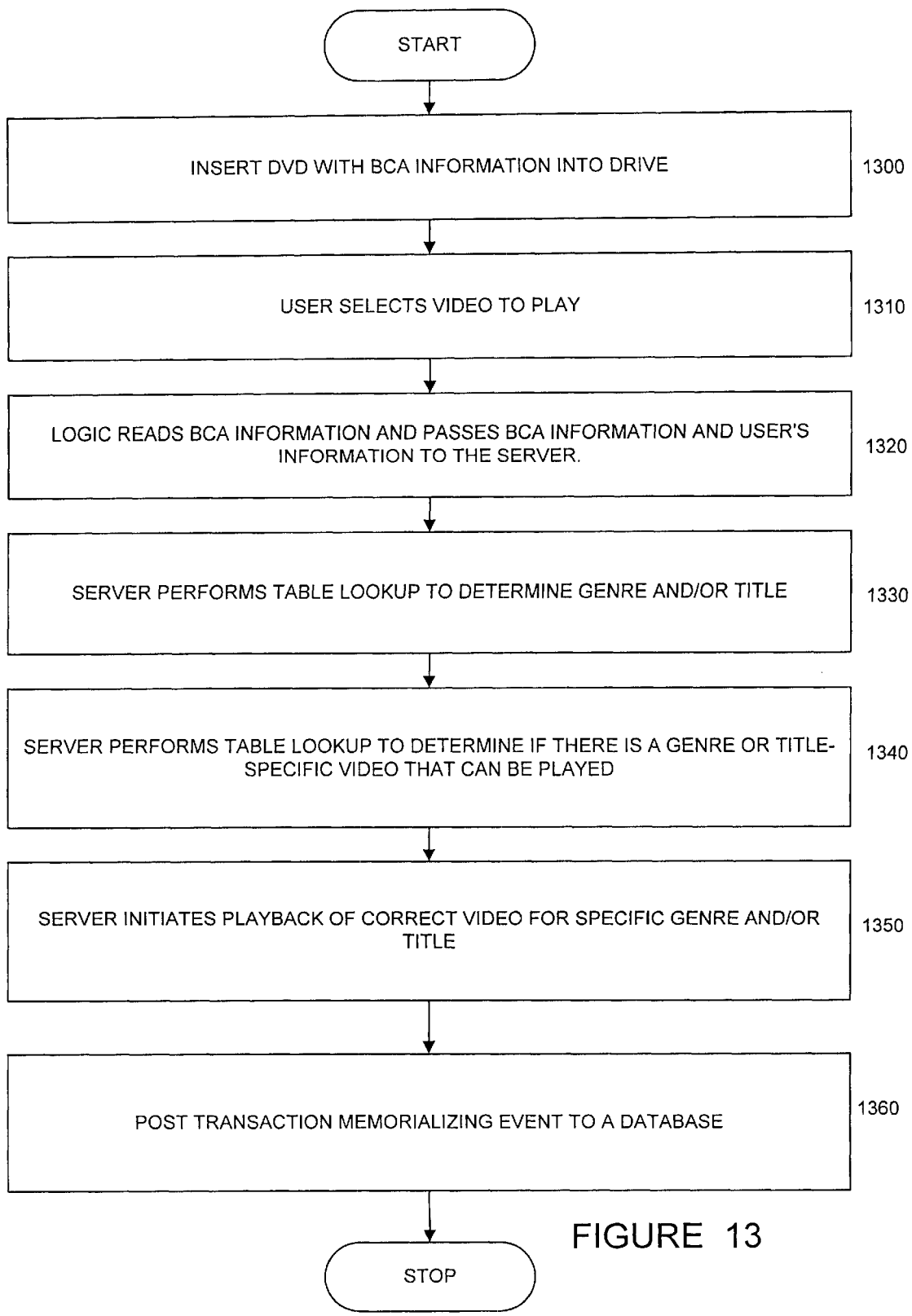
FIG. 13 is a flowchart of a tailored video viewing operation utilizing BCA information for intelligent processing in accordance with a preferred embodiment.

FIG. 13 is a flowchart of a tailored video viewing operation utilizing BCA information for intelligent processing in accordance with a preferred embodiment. Processing commences at 1300 when a user inserts a DVD into a player and video playback is initiated by a user action as shown in function block 1310. When the user selects the play video option at 1310, logic is initiated to read the BCA information and this information is combined with other user information from the server database as shown in function block 1320 and transmitted to the server. The server performs a table lookup to ascertain the genre and/or title as shown in function block 1330. Then the server performs another table lookup to determine the correct genre and/or title video to play as shown in function block 1340. Once the genre and/or title video information is determined for the request initiated by the application in function block 1310, the server initiates playback of the correct video for the genre and/or title as shown in function block 1350. Finally a transaction is posted to the server database that memorializes the events associated with the video viewing operation operation 1360.

Figure 14:
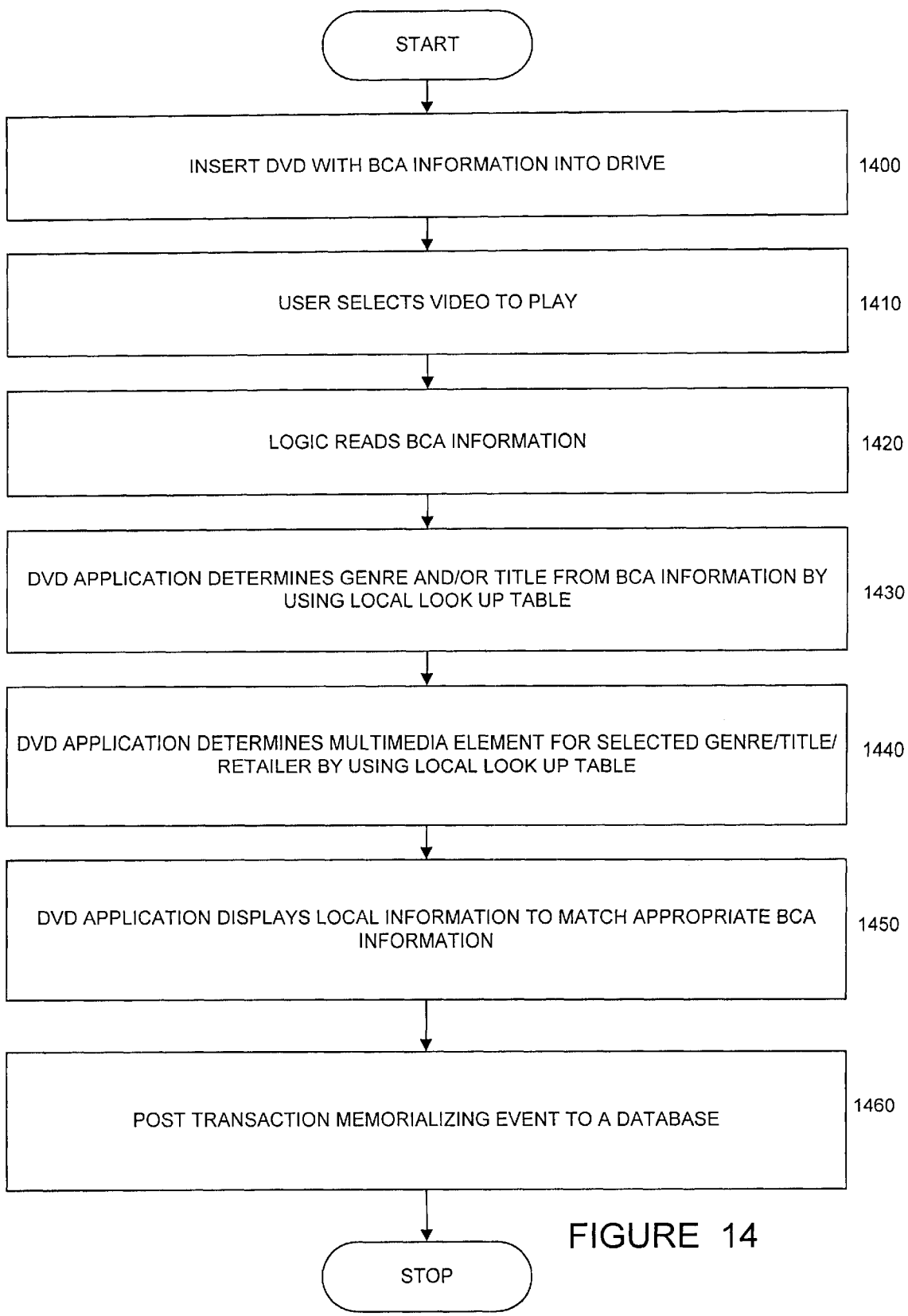
FIG. 14 is a flowchart of the logic associated with a tailored multimedia viewing operation utilizing BCA information for intelligent processing in accordance with a preferred embodiment.

FIG. 14 is a flowchart of the logic associated with a tailored multimedia viewing operation utilizing BCA information for intelligent processing in accordance with a preferred embodiment. Processing commences at 1400 when a user inserts a DVD into a player and view is initiated by a user action as shown in function block 1410. When the user selects the view option at 1410, logic is initiated to read the BCA information as shown in function block 1420. The DVD application performs a local table lookup to ascertain the genre/title/retailer as shown in function block 1430. Then the DVD application performs another local table lookup to determine the correct multimedia element to display as shown in function block 1440. Once the multimedia element is determined for the request initiated by the application in function block 1410, the DVD application initiates playback of the correct mutlimedia element for the genre/title/retailer as shown in function block 1450. Finally a transaction is posted to the server database that memorializes the events associated with the multimedia viewing operation 1460.

Flowcharts for Security Processing in Accordance with a Preferred Embodiment

Figure 15:
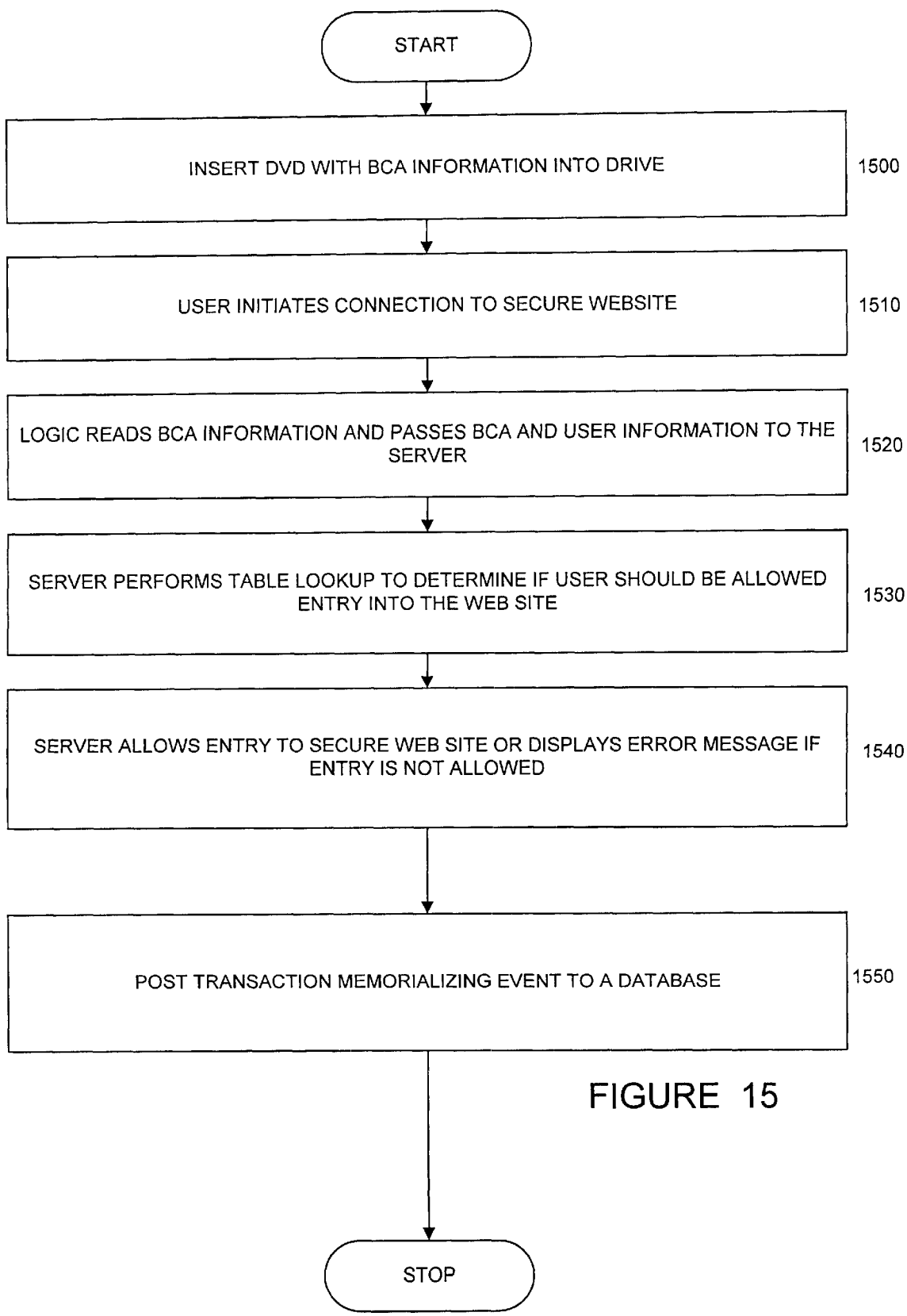
FIG. 15 is a flowchart of a security operation for restricting access to specific web sites utilizing BCA information for intelligent processing in accordance with a preferred embodiment.

FIG. 15 is a flowchart of a security operation for restricting access to specific web sites utilizing BCA information for intelligent processing in accordance with a preferred embodiment. Processing commences at 1500 when a user inserts a DVD into a player and the security operation is initiated by a user action as shown in function block 1510. When the user initiates connection to a secure web site at 1510, logic is initiated to read the BCA information and this information is combined with other user information from the server database as shown in function block 1520. Then the server performs a table lookup to ascertain if the user, based on the BCA number, is allowed access to the secure web site as shown in function block 1530. The server either allows or restricts entry to the web site based on the BCA number as shown in function block 1540. Finally a transaction is posted to the server database that memorializes the events associated with the security operation 1550.

Figure 16:
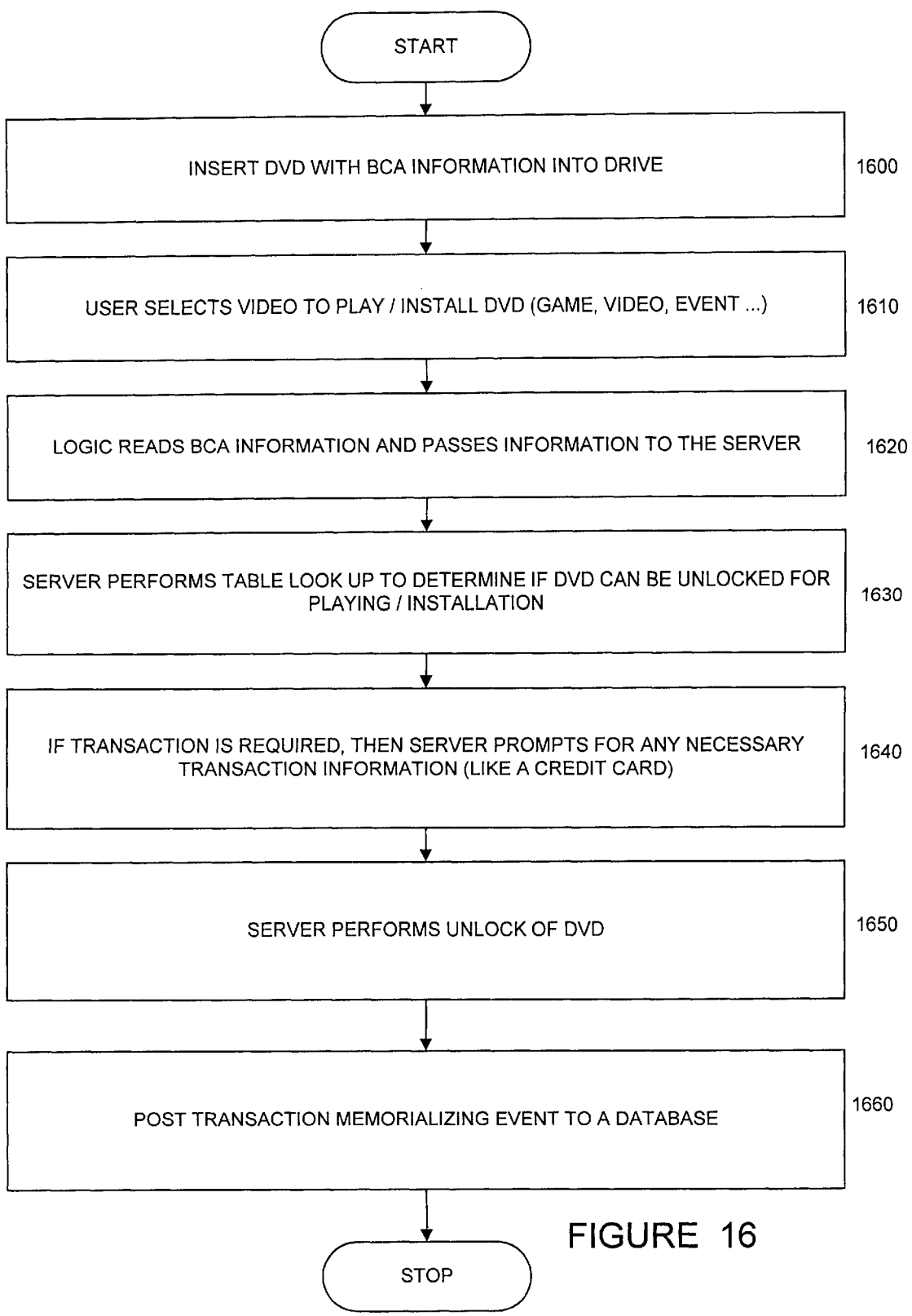
FIG. 16 is a flowchart of a unlock operation for an electronic commerce transaction utilizing BCA information for intelligent processing in accordance with a preferred embodiment.

FIG. 16 is a flowchart of a unlock operation for an electronic commerce transaction utilizing BCA information for intelligent processing in accordance with a preferred embodiment. Processing commences at 1600 when a user inserts a DVD into a player and the unlock operation is initiated by a user action as shown in function block 1610. When the user selects the play/install DVD option at 1610, logic is initiated to read the BCA information and this information is combined with other user information from the server database as shown in function block 1620. Then the server performs a table lookup to ascertain if the DVD can be unlocked for playing or installation as shown in function block 1630. If the server determines that the user must first perform a purchase transaction, the server prompts the user for any necessary transaction information as shown in function block 1640. After the user completes the transaction in function block 1640, or the server determines that a transaction occurred at an earlier time, or if the server determines that a transaction does not need to occur, the server performs the unlock operation as shown in function block 1650. Finally a transaction is posted to the server database that memorializes the events associated with the unlock operation 1660.

Figure 17:
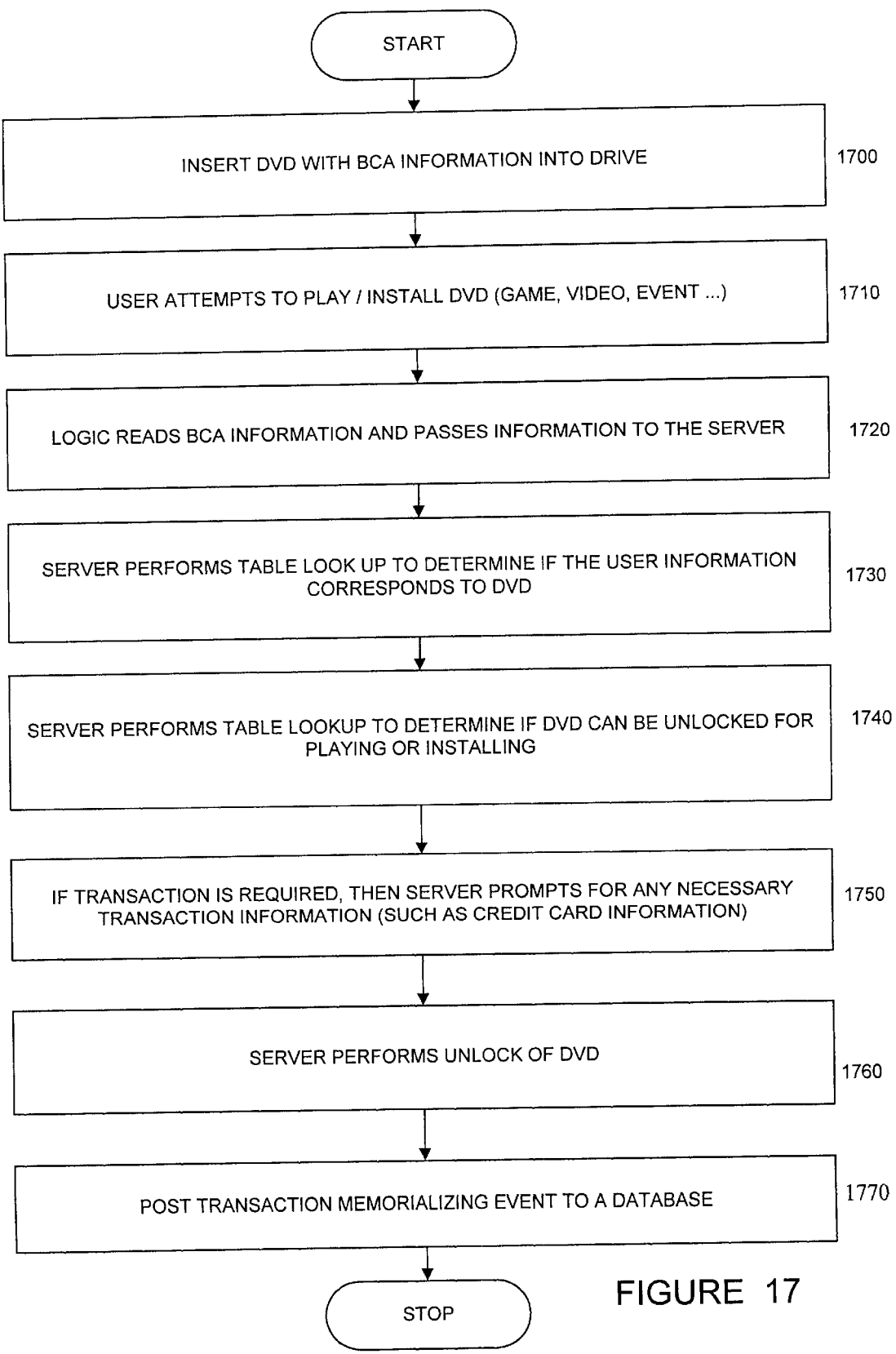
FIG. 17 is a flowchart of an unlocking operation for an electronic commerce transaction utilizing BCA information for intelligent processing in accordance with a preferred embodiment.

FIG. 17 is a flowchart of an unlocking operation for an electronic commerce transaction utilizing BCA information for intelligent processing in accordance with a preferred embodiment. Processing commences at 1700 when a user inserts a DVD into a player and the unlock operation is initiated by a user action as shown in function block 1710. When the user selects the play/install DVD option at 1710, logic is initiated to read the BCA information and this information is combined with other user information from the server database as shown in function block 1720. The server performs a table lookup to ascertain the user information for the DVD using the BCA information as shown in function block 1730. Then the server performs a table lookup to ascertain if the DVD can be unlocked for playing or installation as shown in function block 1740. If the server determines that the user must first perform a purchase transaction, the server prompts the user for any necessary transaction information as shown in function block 1750. After the user completes the transaction in functional block 1750, or if the server determined that a transaction occurred at an earlier time, or if the server determines that a transaction does not need to occur, the server performs the unlock operation as shown in function block 1760. Finally a transaction is posted to the server database that memorializes the events associated with the unlocking operation 1770.

Figure 18:
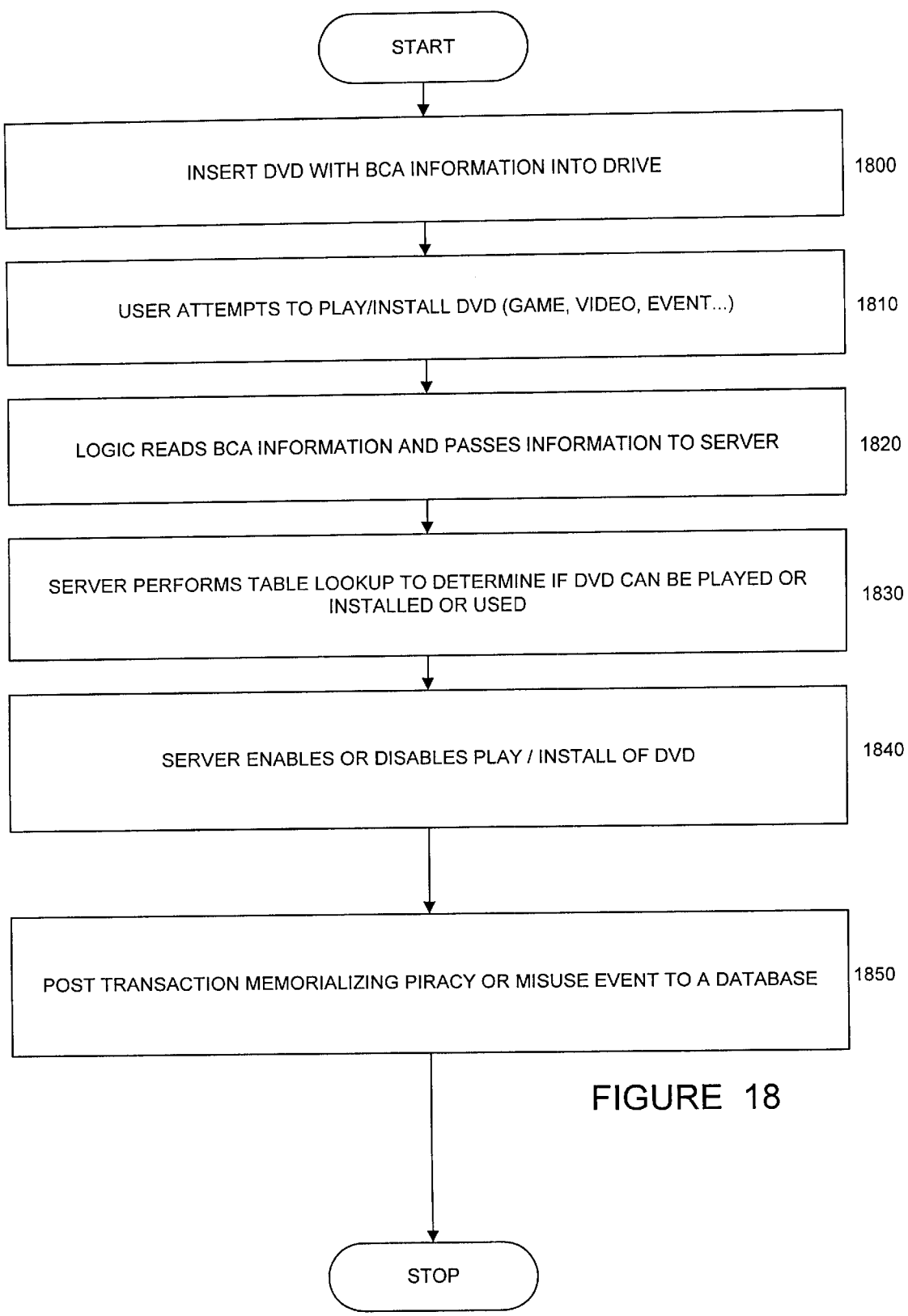
FIG. 18 is a flowchart of a logging operation for tracking piracy and misuse of a DVD utilizing BCA information for intelligent processing in accordance with a preferred embodiment.

FIG. 18 is a flowchart of a logging operation for tracking piracy and misuse of a DVD utilizing BCA information for intelligent processing in accordance with a preferred embodiment. Processing commences at 1800 when a user inserts a DVD into a player and the logging operation is initiated by a user action as shown in function block 1810. When the user user selects the play/install DVD option at 1810, logic is initiated to read the BCA information and this information is combined with other user information from the server database as shown in function block 1820. The server performs a table lookup to ascertain if the user, based on the BCA number, is allowed to apply or install the DVD as shown in function block 1830. Then the server either enables or disables the DVD for playback/installation as shown in function block 1840. Finally a transaction is posted to the server database that memorializes the events associated with the logging operation 1850. The logging information can be used to localize pirated discs to a specific region, track illegal region code use, and trace misuse/pirated DVDs back to retailer, distributor, manufacturer, or content developer.

Support Services

Figure 19:
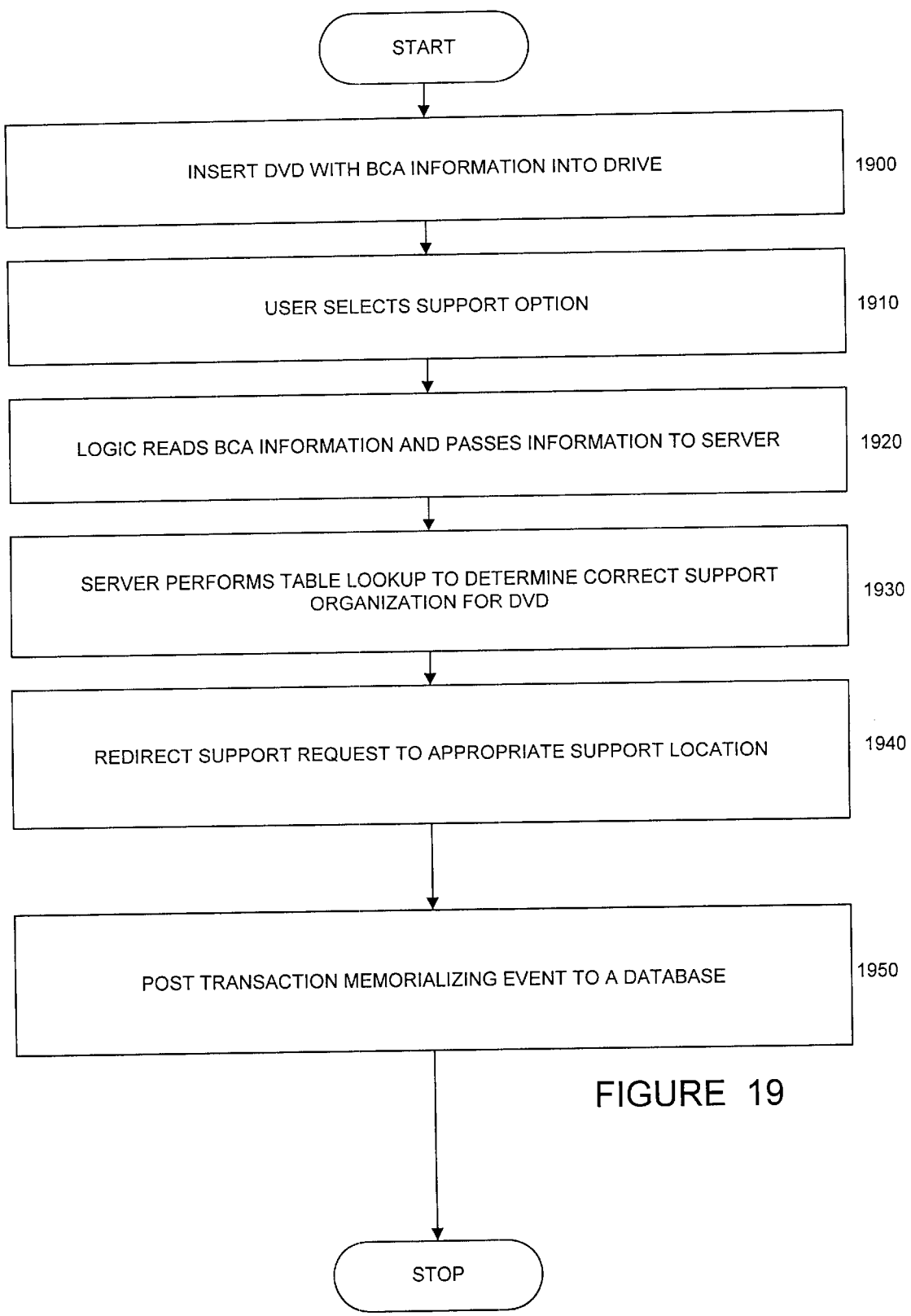
FIG. 19 is a flowchart of a redirect operation for a support transaction for intelligent processing in accordance with a preferred embodiment.

FIG. 19 is a flowchart of a redirect operation for a support transaction for intelligent processing in accordance with a preferred embodiment. Processing commences at 1900 when a user inserts a DVD with BCA information into a player, and the redirect operation is initiated by a user action as shown in function block 1910. When the user selects the support option at 1910, logic is initiated to read the BCA information and this information is combined with other user information from the server database as shown in function block 1920. Then the server performs a table lookup to ascertain the support organization for the original DVD as shown in function block 1930. The support organization becomes the target for the support request that the user initiated in function block 1910, and the support transaction is re-routed to the support organization associated with the DVD in function block 1940. Finally a transaction is posted to the server database that memorializes the events associated with the redirect operation 1950.

Figure 20:
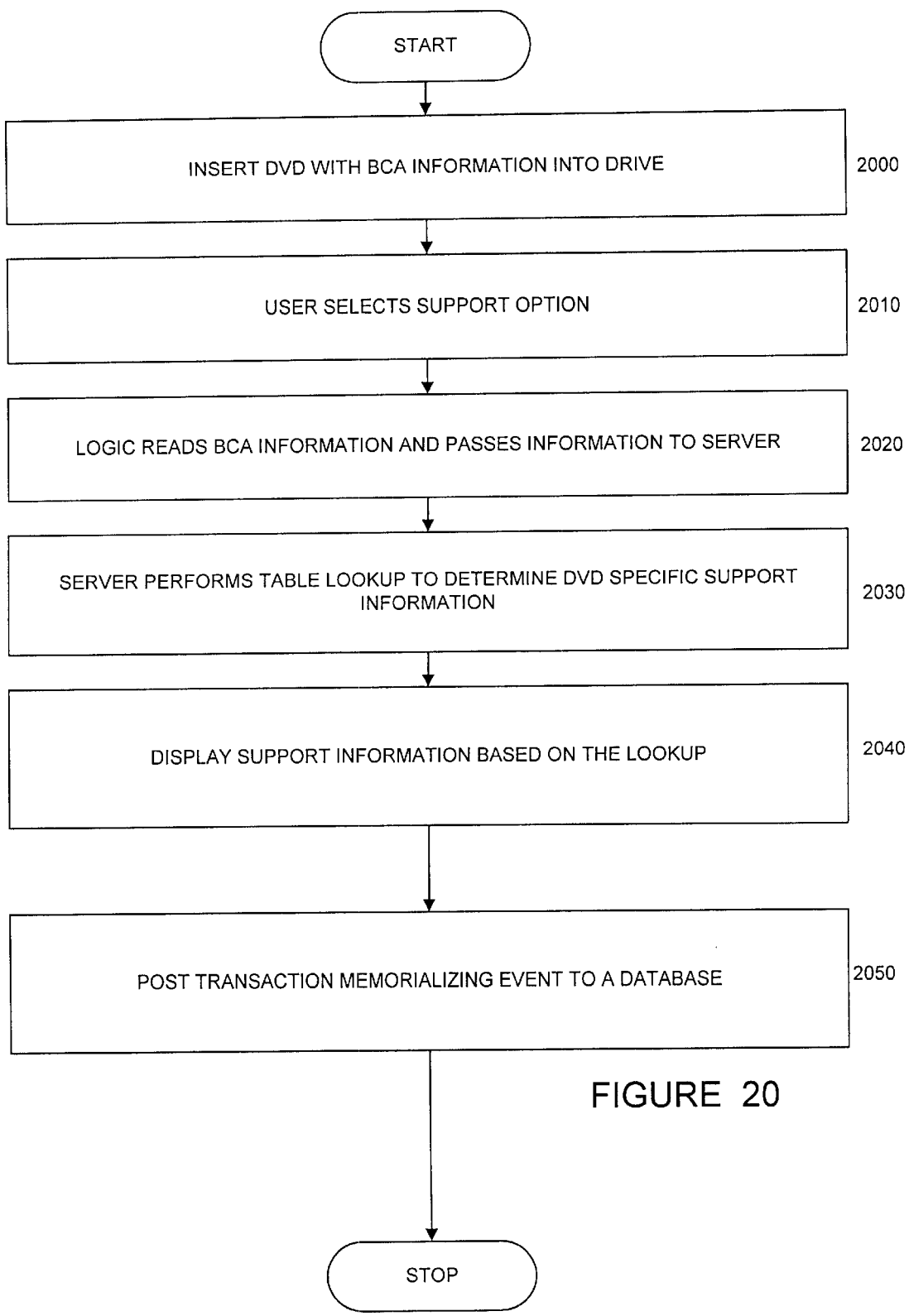
FIG. 20 is a flowchart of a display operation for a support transaction for intelligent processing in accordance with a preferred embodiment.

FIG. 20 is a flowchart of a display operation for a support transaction for intelligent processing in accordance with a preferred embodiment. Processing commences at 2000 when a user inserts a DVD with BCA information into a player, and the display operation is initiated by a user action as shown in function block 2010. When the user selects the support option at 2010, logic is initiated to read the BCA information and this information is combined with other user information from the server database as shown in function block 2020. Then the server performs a table lookup to ascertain the DVD-specific support information for the DVD in the user's player as shown in function block 2030. Once the server has determined the DVD-specific information for the support request initiated by the user in function block 2010, the DVD-specific information is displayed to the user in function block 2040. Finally a transaction is posted to the server database that memorializes the events associated with the display operation 2050.

Figure 21:
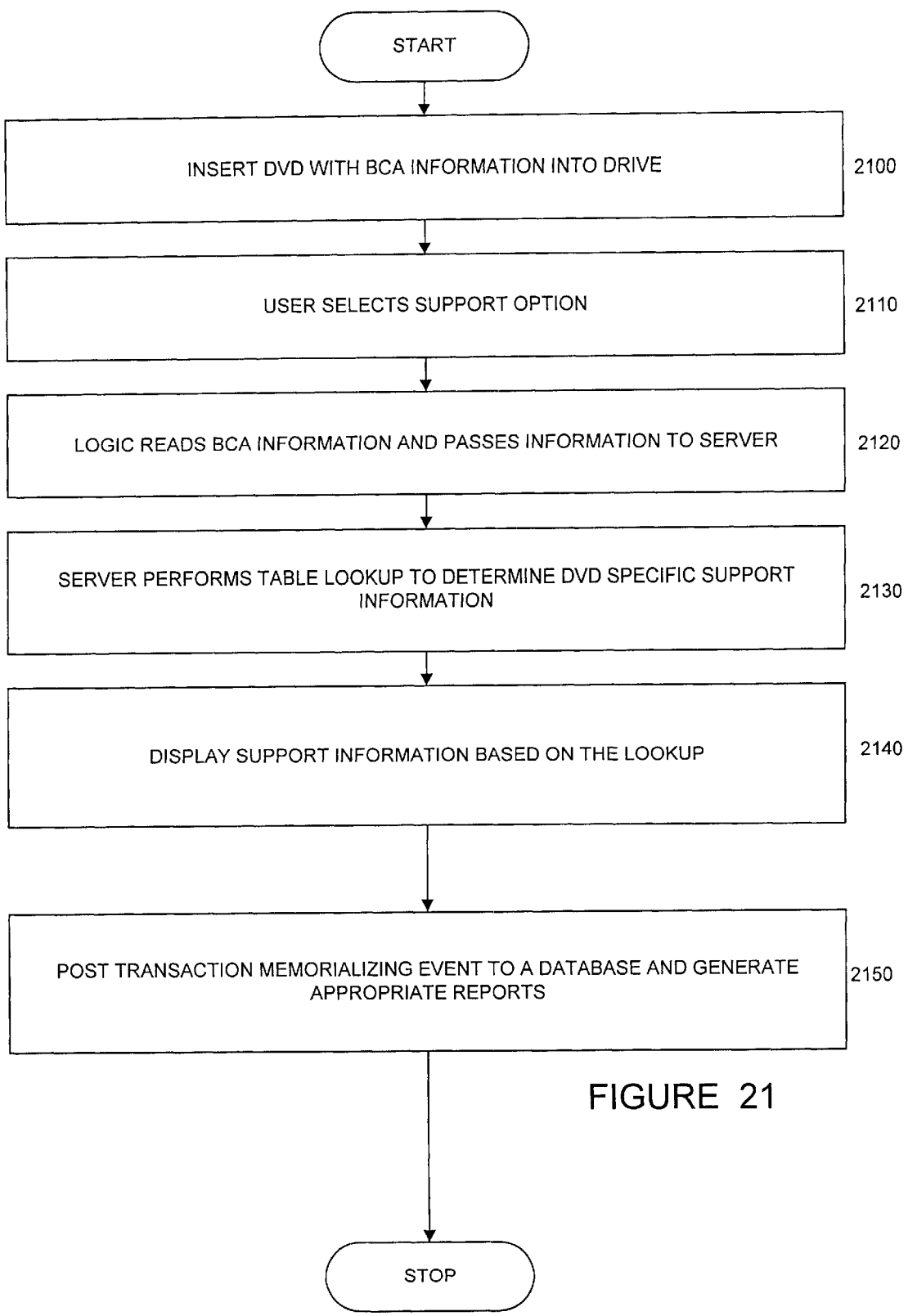
FIG. 21 is a flowchart of support tracking utilizing BCA for intelligent processing in accordance with a preferred embodiment.

FIG. 21 is a flowchart of support tracking utilizing BCA for intelligent processing in accordance with a preferred embodiment. Processing commences at 2100 when a user inserts a DVD with BCA information into a player, and the display operation is initiated by a user action as shown in function block 2110. When the user selects the support option at 2110, logic is initiated to read the BCA information and this information is combined with other user information from the server database as shown in finction block 2120. Then the server performs a table lookup to ascertain the DVD-specific support information for the DVD in the user's player as shown in function block 2130. Once the server has determined the DVD-specific information for the support request initiated by the user in function block 2110, the DVD-specific information is used, for example, to track retailer-specific support issues or geographical support issues as shown in function block 2140. Finally a transaction is posted to the server database that memorializes the events associated with the display operation 2150 and the memorialized information is utilized to generate reports tracking retailer-specific support issues or geographical support issues.

Figure 22:
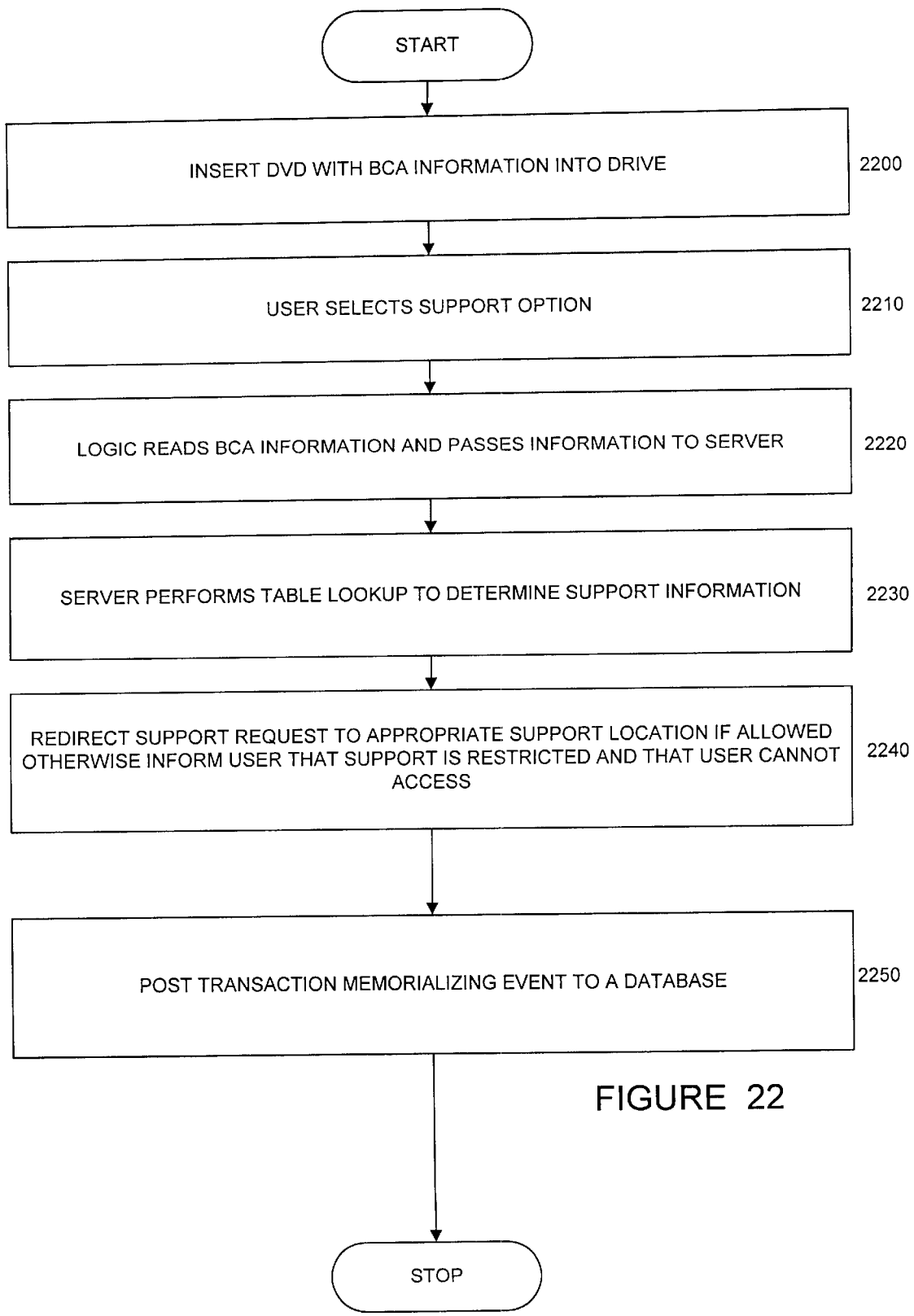
FIG. 22 is a flowchart of a redirect operation for a support transaction for intelligent processing in accordance with a preferred embodiment.

FIG. 22 is a flowchart of a redirect operation for a support transaction for intelligent processing in accordance with a preferred embodiment. Processing commences at 2200 when a user inserts a DVD with BCA information into a player, and the redirect operation is initiated by a user action as shown in function block 2210. When the user selects the support option at 2210, logic is initiated to read the BCA information and this information is combined with other user information from the server database as shown in function block 2220. Then the server performs a table lookup to ascertain the support organization for the original DVD as shown in function block 2230. The support organization becomes the target for the support request that the user initiated in function block 2210, and, if allowed, the support transaction is re-routed to the support organization associated with the DVD in function block 2240. Otherwise, the user is redirected to a location informing the user that support location is not available. Finally a transaction is posted to the server database that memorializes the events associated with the redirect operation 2250.

Figure 23:
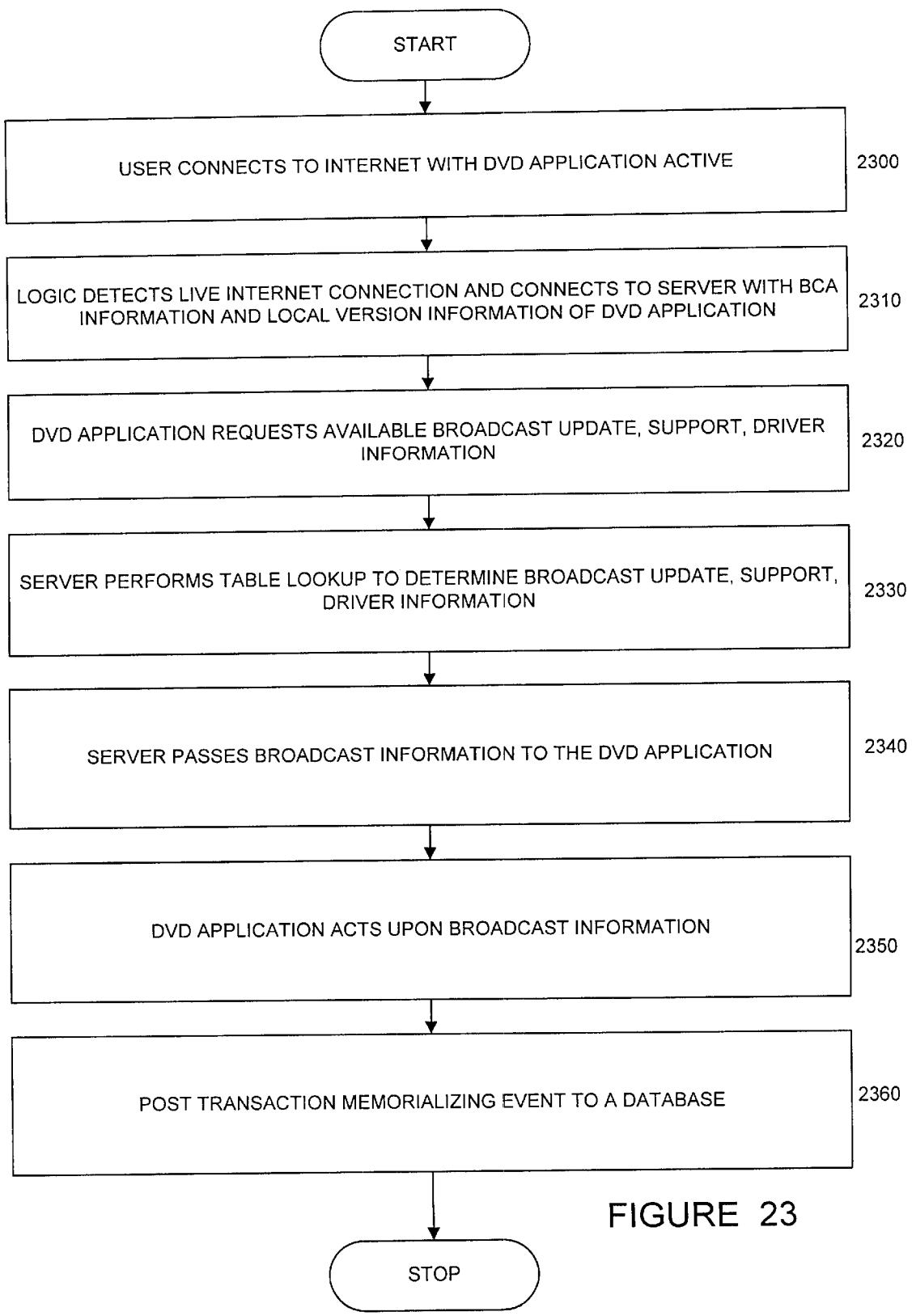
FIG. 23 is a flowchart of a broadcast operation for downloading update, support and application information utilizing BCA information for intelligent processing in accordance with a preferred embodiment.

FIG. 23 is a flowchart of a broadcast operation for downloading update, support and application information utilizing BCA information for intelligent processing in accordance with a preferred embodiment. Processing commences at 2300 when a user connects to the Internet with a DVD application active. Logic detects a live Internet connection, reads the BCA information, determines DVD application version information, and initiates a connection to the server as shown in function block 2310. After logic initiates the connection to the server in 2310, the DVD application requests all broadcast information from the server for the the DVD, as shown in function block 2320. The server performs a table lookup to ascertain the broadcast information for the DVD as shown in function block 2330. Once the broadcast information is determined for the request initiated by the application in function block 2320, the server passes the broadcast information to the application using HTTP protocal as shown in function block 2340. Then the DVD application acts upon the broadcast information by either presenting information to the user or automatically acting upon the information as shown in function block 2350. Finally a transaction is posted to the server database that memorializes the events associated with the download operation 2360. The e-commerce URL is then returned to the ActiveX control so that the consumer's purchase request can be redirected to the appropriate URL.

Visual C++ code in accordance with a preferred embodiment is provided below to further embellish the description of the invention. * These functions are used to obtain BCA information * * DATE NAME REASON * ---- ---- ---- * Mar. 22, 1999 ITI Created * * NOTES: * * © COPYRIGHT 1999 InterActual Technologies, Inc. ALL RIGHTS RESERVED. #include "stdafx.h"#include "scsidefs.h"#include "wnaspi32. h"DWORD xReportBCA (LPBYTE pbData, WORD cbData); DWORD AtapiSendCommand(LPBYTE pPacket, LPBYTE pBuffer, DWORD cbBuffer); DWORD AtapiInit(int index); void AtapiUninito; DWORD xReportBCA(LPBYTE pbData, WORD cbData) DWORD nReturn; UCHAR Cdb[16];

DWORD bWindowsNT FALSE;

OSVERSIONINFO vi;

vi.dwOSVersionlnfoSize =sizeof(vi);

if (GetVersionEx(&vi)) bWindowsNT =(vi.dwPlatformld-=VER_PLATFORM_WIN32_NT);

if (bWindowsNT) return FALSE; II for now not implemented

ZeroMemory(&Cdb,sizeof(Cdb));

Cdb[0] =0xAD; // CMD_READ_DVD_STRUC;

Cdb[7] =0x03; // Format Cdb[8] =HIBYTE(cbData); // sizeof AllocationLength Cdb[9] =LOBYTE(cbData); // sizeof AllocationLength Cdb[10] =0; // Agid nReturn =AtapiSendCommand(Cdb, pbData, cbData);

return nReturn; typedef DWORD (_cdecl *LPFNSENDASPI32COMMAND)(LPSRB); typedef DWORD (_cdecl *LPFNGETASPI32SUPPORTINFO) (VOID); BOOL AspilnquiryCmd(BYTE *pbinq, WORD cbData); // statics yuk static BYTE AdapterCount=0; static BYTE AdapterID=0; static BYTE TargetID=0; LPFNSENDASPI32COMMAND g_fnSendASPI32Command =NULL; LPFNGETASPI32SUPPORTINFO g_fnGetASPI32SupportInfo =NULL; HINSTANCE g_hWNASPI=NULL; DWORD AtapiInit(int index) { if (g_fnSendASPI32Command && g_fnGetASPI32SupportInfo) return TRUE;

```
if (!(g_hWNASPI =LoadLibrary("WNASPI32. DLL")))
return FALSE;
    if (NULL ==(g_fnSendASPI32Command
=(LPFNSENDASPI32COMMAND) GetProcAddress
(ghWNASPI, "SendASPI32Command"))) return FALSE; if
(NULL ==(g_fnGetASPI32SupportInfo
=(LPFNGETASPI32SUPPORTINFO) etProcAddress
(g_hWNASPI, "GetASPI32Supportlnfo"))) return FALSE;
DWORD ASPI32Status =(*g_ffiGetASPI32SupportInfo)();
AdapterCount =(LOBYTE(LOWORD(ASPI32Status))); if
((AdapterCount =0) 11 (HIBYTE(LOWORD
(ASPI32Status)) i=SS-COMP)) return FALSE;
    BYTE pbInq[LEN-INQUIRY-DATA+1];
    for (BYTE aid =0;aid <AdapterCount; aid++) for (BYTE
tid =0;tid <MAX TARGET; tid++){ AdapterID =aid;
    TargetID =tid;
    if (AspilnquiryCmd(pblnq, LEN INQUIRY_DATA)) { if
(DTYPE_CROM ==pblnq[0]) { if(index-- 0) { return
TRUE;
    return FALSE; } void AtapiUninit() { if (g_hWNASPI) {
FreeLibrary(gihWNASPI); g_fnSendASPI32Command
=NULL;
    g_fnGetASPI32SupportInfo =NULL;
    gjhWNASPI =NULL;
    } DWORD AtapiSendCommand(BYTE *pCdb, BYTE
*pbData, DWORD cbData) {
    PSRB_ExecSCSICmd pSrb=(PSRB_ExecSCSICmd)
malloc(sizeof(SRB ExecSCSICmd));
    if (pSrb NULL) return FALSE;
    memset(pSrb, 0, sizeof(SRB_ExecSCSICmd));
    II SendCommand pSrb->SRB Cmd =SC EXEC SCSI
CMD;
    pSrb->SRB_Status =Oxff;
    pSrb->SRB_HaId =AdapterID;
    if ((pCdb[0] ==OxA3) && (cbData !=0)) pSrb-
>SRB_Flags =SRB_DIR_OUT;
    else if(pCdb[0 ] =0x43) pSrb->SRB_Flags
=SRB_DIR_IN;
    else pSrb->SRB_Flags =SRB_DIR_SCSI;
    pSrb->SRB_Target =TargetID;
    pSrb->SRB_BufLen =(DWORD)cbData;
    pSrb->SRB_BufPointer =pbData;
    pSrb->SRB_SenseLen =SENSE_LEN; pSrb-
>SRB_CDBLen =LEN_ATAPI_PACKET; pSrb-
>SRB_HaStat =Oxff; pSrb->SRB_TargStat =Oxff; memepy
(pSrb->CDBByte, pCdb, LEN_ATAPI_PACKET);
DWORD ASPI32Status =(*g_ffiSendASPI32Command)
(pSrb); DWORD timeout =600; while ((pSrb->SRB_Status
SS_PENDING) && (timeout >0)) { Sleep(I 0); timeout--; }
if (pSrb->SRB_Status ==SS COMP){ free(pSrb); return
TRUE; if ((pSrb->SRB_Status==SS ERR) && (pSrb-
>SRB_TargStat=STATUS_CHKCOND)) { } free(pSrb);
return FALSE; } BOOL AspilnquiryCmd(BYTE *pbInq,
WORD cbData) { BYTE Cdb[LEN-ATAPI_PACKET];
memset(Cdb, 0, LEN_ATAPI_PACKET); Cdb[0]
=SCSI_INQlIRY; Cdb[4] =LEN_INQUIRY_DATA; PSR-
B_ExecSCSICmd pSrb =PSRB_ExecSCSICmd)malloc
(sizeof(SRB_ExecSCSICmd)); if (pSrb ==NULL) return
FALSE; memset(pSrb, 0, sizeof(SRB-ExecSCSICmd));
pSrb->SRB_Cmd =SC_EXEC_SCSI_CMD; pSrb-
>SRB_Status =Oxff; pSrb->SRB_HaId =AdapterID; pSrb-
>SRB-Flags =SRB_DIR_SCSI; pSrb->SRB_Target Tar-
getID; pSrb->SRB_BufLen =(DWORD)cbData; pSrb-
>SRB_BufPointer =pbInq; pSrb->SRB_SenseLen
=SENSE_LEN; pSrb->SRB CDBLen =6; pSrb->SRB
HaStat =Oxff; pSrb->SRB-TargStat =Oxff; memcpy(pSrb-
>CDBByte, Cdb, LEN_ATAPI_PACKET); // Send Com-
mand 20 DWORD ASPI32Status
(*g_ffiSendASPI32Command)(pSrb); DWORD timeout
=600; 1* Wait for pending status */ while ((pSrb->SRB-
Status -SS-PENDING) && (timeout >0) Sleep(IO);
timeout--; /* Check Error Code * if (Srb->SRB-Status
-SS-COMP){ free(pSrb); return TRUE; /* Set last device
error */ if ((pSrb->SRB_Status==SS_ERR) && (pSrb-
>SRB-TargStat==STATUS_CHKCOND)) free(pSrb);
return FALSE;
```

Alternate Embodiments

It should be noted that varoius permutations of serialization may be employed including, but not limited to a watermark, hologram, and any other type in substitution or combination with the BCA information without diverging from the spirit of the claimed invention.

Watermarking

Digital video data can be copied repeatedly without loss of quality. Therefore, copyright protection of video data is a more important issue in digital video delivery networks than it was with analog TV broadcast. One method of copyright protection is the addition of a "watermark" to the video signal which carries information about sender and receiver of the delivered video. Therefore, watermarking enables identification and tracing of different copies of video data. Applications are video distribution over the World-Wide Web (WWW), pay-per-view video broadcast, or labeling of video discs and video tapes. In the mentioned applications, the video data is usually stored in compressed format. Thus, the watermark must be embedded in the compressed domain. An approach for robust watermarking of MPEG-2 encoded video is presented in accordance with an alternate embodiment. The method is of much lower complexity than a complete decoding process followed by watermarking in the pixel domain and re-encoding. Although an existing MPEG-2 bitstream is partly altered, the method avoids drift by adding a drift compensation signal. The method has been implemented and the results confirm that a robust watermark can be embedded into MPEG-encoded video which can be used to securely transmit arbitrary binary information at a data rate of several bytes/second.

The method is easily applicable to other video coding schemes like MPEG-1, H.261, and H.263. Digital watermarks exist at a convergence point where creators and publishers of digitized multimedia content demand localized, secured identification and authentication of that content. Because existence of piracy is clearly a disincentive to the digital distribution of copyrighted works, establishment of responsibility for copies and derivative copies of such works is invaluable. In considering the various forms of multimedia content, whether "master," stereo, NTSC video, audio tape or compact disc, tolerance of quality degradation will vary with individuals and affect the underlying commercial and aesthetic value of the content.

It is desirable to tie copyrights, ownership rights, purchaser information or some combination of these and related data to the content in such a manner that the content must undergo damage, and therefore a reduction in value, with subsequent, unauthorized distribution of the content, whether it be commercial or otherwise. Legal recognition and attitude shifts, which recognize the importance of digital watermarks as a necessary component of commercially distributed content (audio, video, game, etc.), will further the development of acceptable parameters for the exchange of such content by the various parties engaged in the commercial distribution of digital content.

These parties may include artists, engineers, studios, Internet access providers, publishers, agents, on-line service providers, aggregators of content for various forms of delivery, on-line retailers, individuals and parties that participate in the transfer of funds to arbitrate the actual delivery of content to intended parties. Since the characteristics of digital recordings vary widely, it is a worth while goal to provide tools to describe an optimized envelope of parameters for inserting, protecting and detecting digital watermarks in a given digitized sample (audio, video, virtual reality, etc.) stream. The optimization techniques described hereinafter make unauthorized removal of digital watermarks containing these parameters a significantly costly operation in terms of the absolute given projected economic gain from undetected commercial distribution. The optimization techniques, at the least, require significant damage to the content signal, as to make the unauthorized copy commercially worthless, if the digital watermark is removed, absent the use of extremely expensive tools. Presumably, the commercial value of some works will dictate some level of piracy not detectable in practice and deemed "reasonable" by rights holders given the overall economic return. For example, there will always be fake $100 bills, LEVI jeans, and GUCCI bags given the sizes of the overall markets and potential economic returns for pirates in these markets—as there also will be unauthorized copies of works of music, operating systems (Windows 98, etc.), video and future multimedia goods. However, what differentiates the "digital marketplace" from the physical marketplace is the absence of any scheme that establishes responsibility and trust in the authenticity of goods. For physical products, corporations and governments that mark the goods and monitor manufacturing capacity and sales to estimate loss from piracy. There are also no reinforcing mechanisms, including legal, electronic, and informational campaigns to better educate consumers.

With the advent of digital video and digital video broadcasting, issues of copyright protection have become more important, since the duplication of digital video does not result in the inherent decrease in quality suffered by analog video. One method of copyright protection is the addition of a "watermark" to the video signal. The watermark is a digital code embedded in the bitstream of the digital video that typically identifies the copyright owner. The watermark, if applied to individual copies of the video, may also be used to identity of the receiver of each copy. This processing identifies illegally reproduced copies and facilitates tracing back to the receiver from which they originated. For watermarking of digital video, a number of different characteristics of the watermark are desirable. First, the watermark should be embedded in such a way that it is imperceptible or barely perceptible to a viewer of the video. Secondly, the watermark should be such that it cannot be removed by intentional or unintentional operations on the digital video bitstream or on the decoded video without, at the same time, degrading the perceived quality of the video to the point of significantly reducing its commercial value (a characteristic referred to as "robustness"). Thirdly, since the video may be stored for broadcast in a compressed form (such as in a "video-on-demand" server), it is desirable to be able to incorporate the watermark into the bitstream without having to decode the signal first and to re-encode it after adding the watermark. This can be accomplished with the watermarking of digital still images, but the method used does not lend itself to digital video, due to the additional constraints which video signals present. Many digital video applications are "constant bit rate" applications, which do not tolerate increases in the bit rate of the transmitted bitstream. Even in those applications which are not restricted to a constant bit rate, unnecessary increases in the bit rate should be avoided, so as to preserve the real-time decodability of the video signal when transmitted over a channel having a given bandwidth. Thus, it is desirable that the addition of the watermark does not increase the bit rate of the video signal. Past watermarking techniques for digital video are limited to the watermarking of uncompressed video data. However, since video sequences are often stored in a compressed format (thereby saving on memory space), watermarking the signal in a way which uniquely identifies each receiver of the signal would require decoding of the signal, addition of the watermark, and recoding before the signal is transmitted. This clearly places a significant time and processing burden on the task of delivering the video sequence.

Hologram

Information exchange and transfer over a shared transmission channel present a challenge to the security of sensitive information. Internet and Intranet are two examples of such a shared information transmission channeling which many computers are connected with one another by local or wide area communication networks. It is therefore possible for any user or an intruder to intercept a package of sensitive data that is transmitted over the shared channel. In particular, the internet is a rapidly growing business forum and securing information transferred through its channels is becoming a major concern for transmitting proprietary information. Data encryption techniques can be used to increase the security in data exchange and transfer over a shared transmission channel. In its simplest form, data encryption uses a "key" based on a particular algorithm to change the sequence of a package of data that contains a piece of confidential information ("plain text") so that the data is enciphered or "scrambled" into an form that appears to have no correlation with the embedded confidential information ("cipher text"). An unauthorized user, who does not have the knowledge of either the encryption method (e.g., the encryption algorithm) or the key formed based on the encryption method, cannot easily decode the information. An authorized user recovers the embedded information in the scrambled data by using a "key" that is constructed based on the encryption method. Therefore, even if the unauthorized user obtains the scrambled data, the knowledge of both of the encryption method and the particular key is needed to decrypt the confidential information embedded therein.

One well-known encryption system is the Data Encryption Standard (DES) adapted in 1977 by the National Bureau of Standards. This is a secret-key crypto system to exploit confusion and diffusion techniques, allowing acceptable security using key lengths as short as 64. The number of keys in crypto systems based on the DES can be as many as 512 keys with the current computational power. However, increased key lengths "cost" significant delays in transmitting and receiving the encoded information. Two main kinds of crypto systems are a symmetrical system, i.e., the private key system, and an asymmetrical system, i.e., the public-private key system. The DES symmetric crypto systems typically encrypt 64 bit blocks of plain text using a key length of 56 bits. The fundamental building blocking DES (referred to as a round) is a single combination of a substitution followed by a permutation of the text, based on the key.

The plain text is encoded through 16 rounds of a function, which usually implement substitution, permutation, XOR and shift operations on subsets of the text and the key in such a way that every bit of the cipher text depends on every bit of the plain text and every bit of the key. This means that if a single bit of the cipher text is corrupted during transmission, the entire message may be lost. This is another weakness of DES-type block ciphers. In each round, a different subset of the elements from the key, Ki, are used to perform the encryption (hence K1 is applied during the first round, and Ki is applied during the ithround, etc.). An analogous algorithm is used to decrypt the cipher text, but the keys are now applied in reverse order, and the shift operations change from left to right. Given the complexity of the DES algorithm, the speed at which DES is encrypted is a function of the processor characteristics for both hardware and software implementations. For example, Digital Equipment Corporation makes a hardware DES chip which can encrypt and decrypt at a rate of 1GBit/sec, or 15.6 million DES blocks per second. Software implementations are slower; for example, an IBM 3090 mainframe can encrypt 32,000 DES blocks per second.

Typical software implementation performances for microcomputers are listed in the Table 1 herein. TABLE 1 Encryption Rates using some microprocessors Bus width DES Blocks Processor Speed (MHz) (bits) (per/sec) 8088 4.7 8 37068000 7.6 16 90080286 6.0 16 1,10068020 16.0 32 3,50068030 16.0 32 3,90080280 25.0 16 5,00068030 50.0 32 9,60068040 25.0 32 16,00068040 40.0 32 23,20080486 33.0 32 40,600. Another prior art cryptography system is the RSA Public Key Crypto system available from the RSA Data Security in California. RSA is an asymmetric crypto system in which two different keys are used: a public key to encrypt the plain text and a private key to decrypt the cipher text. The hardware implementations of RSA are usually about 1000 to 10,000 times slower than a hardware implementation of DES. In software implementations, RSA is generally about 100 times slower than DES. These numbers will improve as technology advances, but the processing speed of RSA will be difficult to approach the speed of a symmetric crypto system. Consequently, RSA is generally not viewed as a replacement for DES or any other fast bulk encryption algorithm. Instead, RSA is often used for secure key exchange without prior exchange of secrets. Hence a long message is encrypted with DES.

The message is sent with its DES key encrypted via RSA public key encryption. Many other prior-art encryption systems are variations of the DES-type encryption. Generally, it is suspected that given the advanced state of computational processors, DES may no longer be safe against a brute-force attack, so alternatives have actively been sought since the late 1980's. In response to this need, several alternatives have been developed and are thought to be competitive with DES in terms of the e level of security provided. Examples of these systems include the following encryption methods.

(1) Triple DES. This is a variation of DES where the plain text is encrypted with the DES algorithm by three different keys in succession. This s is c commonly accepted to be equivalent to increasing the size of the DES key to 112 bits. Triple encryption of the plain text is the current method of dealing with misgivings about DES's security, but this is clearly done at the expense of the throughput rate for encrypting and decrypting messages.

(2) REDOC, a block algorithm which has a 20 byte (160-bit key) and that operates on an 80 bit block. All of the manipulations, (i.e. substitutions, permutations, and key XOR's) are performed on bytes, which makes it more efficient in software than DES whose initial and final permutations are difficult to efficiently implement in software. In addition, the 160 bit key usually makes this algorithm very secure.

(3) Khufu is a recently proposed 64 bit block cipher, which calls for a 512-bit key, and leaves the number of rounds open (either 16, 24, or 32). Because of the large key, and the potentially expanded number of rounds, the security of this algorithm is expected to be very high. However, increasing the number of rounds has the disadvantage of slowing the rate at which data can be encrypted.

(4) IDEA is a 64-bit block cipher that utilizes a 128 bit key. It usually utilizes three basic operations, XOR, addition modulo $2^{16}$, and multiplication modulo $2^{16}$. The algorithm typically operates on 16-bitsub-blocks, which makes it efficient, even on 16 bit processors. Its current software implementations are about as fast as DES. In view of the limitations and disadvantages of the various prior-art encryption systems, the inventors of the p resent invention developed a new crypto system based on optical phase modulation and a corresponding implementation interface between a user computer and the network. An embodiment in accordance with the present invention can exchange any of these methods for enciphering information embedded in a digital bit stream prior to digitization and transmission over a shared network such as the internet.

A holographic de-scrambler can be used at the receiving end in accordance with a preferred embodiment by an authorized user to decipher the information. One of many advantages of the present invention is the potential to achieve high rate of encryption/decryption (e.g., larger than 1 Gbit/s) as optical fiber networks of high data rates (e.g., larger than 2.4 Gbit/s) become more common. In one of several preferred embodiments of the present invention, a package of digital data is first imprinted on a carrier light beam. This is done by using a two-dimensional spatial light modulator. The phase of the data-bearing optical waveform is subsequently distorted by a phase-scrambling medium. Next, the data-bearing optical waveform with distorted phase is used to form an optical hologram with a reference beam. The hologram is then converted into electronic signals which are sent to its destination in digital form over a shared transmission channel. At the destination where the scrambled data is received, the hologram is displayed in a spatial light modulator and a conjugate reconstruction thereof is performed to generate a conjugate of the data-bearing signal waveform with distorted phase. A holographic medium having information indicative of the phase-scrambling medium is used to unscramble the phase and the embedded data is retrieved from the conjugate reconstruction optical waveform by using a light detector array such as a CCD array. One aspect of the present invention is to achieve optical encryption keys up to and greater than $10^6$ keys to enhance the security.

This is a difficult implementation for many prior art systems. Such a large number of encryption keys is possible because of the unique optical analog technique in accordance with the present invention. It is another aspect of the present invention to insure fast enciphering and deciphering of a large encryption key that are rarely obtainable with the prior-art systems. The preferred embodiments implement this by using the high-speed optical reconstruction of a data-bearing hologram and the capability of parallel processing of optical data processing devices. It is yet another aspect of the present invention to increase the confidentiality of the encryption schemes by using unconventional analog-based enciphering and deciphering of digital data. This aspect is particularly advantageous in view of the current lack of a theoretical foundation for decrypting analog-based encryption. A brute force attacked encryption based on algorithm techniques is nearly impossible for invading the cryptography systems in accordance with the present invention. It is yet another aspect of the present invention to use optical phase information in a nonobvious way to encipher and decipher digital data. It is yet another aspect of the present invention that optical holographic techniques are used in both enciphering and deciphering processes to further enhance the confidentiality of the encryption systems in accordance with the present invention. It is yet another aspect of the present invention that the phase conjugate reconstruction of data-bearing holograms are implemented in preferred embodiments to ensure the high fidelity of the analog deciphering process. It is yet another aspect of the present invention to integrate optical processing technology, hardware encryption, opto-electronic interfacing, and high-fidelity and fast-speed digital signal transmission to form a highly secure, fast and versatile encryption system that works independent of the transmission media utilized. It is still another aspect of the present invention to complete the encryption or decryption process in a single step, instead of the 16 rounds of complex computations typically found in most symmetric encryption schemes. In the optical encryption systems in accordance with the present invention, the encrypting speed is usually not limited by the size of the encryption key, but rather by the system speed in converting between the electronic-to-optical and the optical-to-electronic information modes.

Other Serialization

In the past, merchants have unsuccessfully employed various methods in an attempt to track and identify their inventory. Engraving, stamping, painting, and marking are several methods that merchants have employed. Due to practical problems, those methods are not effectively applicable to the CD multimedia rental industry.

As is known in the art and industry of compact disc multimedia, graphical information identifying the program title and author of a recording is ordinarily placed on the top surface of a CD. Digital data is stored on or just below that top surface. In particular, digital data is stored immediately below such graphical information between the top surface and the bottom surface of the CD. The bottom surface of the CD is comprised of a section of clear material through which, in accessing the data, a laser beam from a compact disc player radiates upward.

The digital data is delicate and can easily be damaged during processes typically used to identify merchandise, which include engraving, stamping, or marking. As stated above, the digital data is closer to the top surface of the CD than it is to the bottom surface. Although the top surface of a CD usually contains graphical information applied by silk screening that partially protects the digital data from damage, the silk screened layer is thinner and more fragile than the bottom surface of a CD which comprises clear material. Thus, there is a greater need to protect the top surface of the CD and the digital data close to it from physical damage such as scratching.

Engraving may be used to identify merchandise. Engraving CDs with identification markings is problematic since engraving is often attempted on the top surface of the CD and such engraving could interfere with the digital data next to it. Moreover, even if engraving is attempted on the bottom surface of a CD where it is less likely that digital data will be damaged, the data may still be damaged during engraving due to the pressure required to be placed on the top of the CD to hold it in place and the heat that may result from such engraving. In addition, engraving may be undesirable since it is a relatively labor intensive and costly process, especially in high volume situations.

Thus, merchants have considered other less invasive methods of identification such as, for example, painting. Painting also fails to provide an effective means of identification or security due to the labor required, the cost required, and the inherent unreliability of the process given the ease with which a person can duplicate such painting. Moreover, painting may pose other problems since harm to the digital data must be avoided.

Still another option of identifying and securing inventory is the use of ordinary adhesive stickers. Such stickers do not provide an effective means of identification due to the ease with which such stickers can be removed and reaffixed to similar looking items without a means of clearly indicating any tampering with the sticker. In addition, such stickers may be difficult to manually apply to CDs (since any sticker should be precisely centered on the CD) in the absence of an applicator workstation such as the one disclosed herein. In addition, such stickers may be easy to duplicate.

Magnetic-type EAS systems are widely used to inhibit the theft of merchandise such as clothing, books, cassettes and compact disks. Electronic article surveillance (EAS) systems are often used to prevent unauthorized removal of articles from a protected area, such as a library or retail store. An EAS system usually includes an interrogation zone or corridor located near the exit of the protected area and markers or tags attached to the articles to be protected. EAS systems have been based on magnetic, RF, microwave and magneto-restrictive technologies. Regardless of the particular technology involved, the EAS systems are designed such that the tag will produce some characteristic response when exposed to an interrogating signal in the corridor. Detection of this characteristic response indicates the presence of a sensitized tag in the corridor. The EAS system then initiates some appropriate security action, such as sounding an audible alarm, locking an exit gate, etc. To allow authorized removal of articles from the protected area, tags that are either permanently or reversibly deactivatable (i.e., dual status tags) are often used.

Although EAS markers have been in common use for the theft protection of optically recorded media such as compact disks and CD-ROM's, the markers have generally been adapted for attachment to the packages containing new compact disks and have been poorly suited for direct attachment to the compact disk itself for libraries and other institutions that repeatedly check compact disks in and out to accommodate the needs of customers and clients, effective inventory control would prefer that EAS markers are attached to the compact disk.

Some markers for direct attachment to compact disks have been developed. One, available as "DCD-1" from Minnesota Mining and Manufacturing Company, St. Paul, Minn., is a single marker strip and security overlay which are attached to a compact disk. However, this marker adversely effects the mechanical balance of the disk, which can adversely affect the operation of modern high rotation speed CD-ROM drives, CD players, and other optically recorded media playback equipment which require that the media be mechanically balanced for proper operation. Another product, "CD-Guard", available from Knogo North America, Inc., Hauppauge, Long Island, N.Y., suffers the same mechanical balance drawback. An optical information storage disk comprising an embedded, generally annular, dual-status EAS marker is described in coassigned U.S. Pat. No. 5,347,508.

Other Media

It should be noted that the principles of the present invention may be applied to other types of media beyond the electronic storage medium discussed hereinabove. As a disk-like recording medium (referred to hereinafter as an optical disk) on and from which an information signal is recorded and reproduced by laser beam, there are now commercially available a so-called compact disc with audio data recorded therein, a CD-ROM in which computer data is recorded, a write once optical disk on which an information signal can be recorded once and a recordable optical disk in which an information signal can be reproduced, recorded and erased.

The read-only optical disk such as a compact disc or CD-ROM has tracks on which irregular patterns, i.e., phase pits are concentrically or spirally formed on the basis of a recorded information signal formed on one surface thereof. Specifically, the read-only optical disk is composed of a disk base plate made of a transparent synthetic resin such as polycarbonate or PMMA (polymethyl methacrylate), a reflection film made of a metal such as Al or Au formed so as to cover phase pits formed on one surface of the disk base plate and a protection layer formed so as to cover the reflection film in order to protect the reflection film.

When an information signal is reproduced from the read-only optical disk, laser beam from a laser light source is converged by an objective lens and irradiated on the read-only optical disk from the disk base plate side. Reflected light flux modulated by the phase pits on the optical disk is detected by a photodetector, for example, and converted into a detected signal having a signal level corresponding to an intensity of reflected light flux, thereby allowing a reproduced signal of the information signal recorded on the read-only optical disk to be obtained.

While the read-only optical disk can provide mass-produced products (optical disks) inexpensively on the market, it is not suitable for products of small demand. For this end, write once optical disks are prepared for optical disk products of small demand and a variety of data can be provided to the user easily. As write once optical disks, there are available a write once optical disk of recording system using physical chemical change of pigment, a write once optical disk of a single layer hole forming recording system, a write once optical disk of multi-layer hole forming recording system, a write once optical disk of phase-change recording system and a write once optical disk of bubble-foaming system. Upon reproduction, in a manner similar to the read-only optical disk, a laser beam (having a weak reproduction laser power) from a laser light source is irradiated on the disk from the disk base plate side under the condition that the laser beam is converged by an objective lens. Then, reflected light flux that is modulated by previously-recorded pits is detected by a photodetector and the detected signal is converted into a detected signal having a signal level corresponding to an intensity of a reflected light bundle, thereby obtaining a reproduced signal of an information signal recorded on the write once optical disk.

When an information signal is recorded on the above write once optical disk, a laser beam (having a strong recording laser power) from a laser light source is irradiated on the optical disk from the disk base plate side under the condition that the laser beam is converged by an objective lens. Then, the power of the laser beam is turned on and off by modulating the laser beam in response to an information signal and pits (pits substantially similar to those recorded on the read-only optical disk) corresponding to the information signal are formed along recording tracks of the optical disk. Specifically, in the case of the single layer hole forming recording system, a hole is formed on the recording track at an area irradiated with a strong laser beam and this hole is recorded as a pit. In the case of a multi-layer hole forming recording system, a hole is formed on the recording track at an area irradiated with a strong laser beam, e.g., the film of the first layer and the hole on the first layer are recorded as a pit.

In the case of the phase change recording system, a portion of the recording track irradiated with a strong laser beam is changed from the amorphous state to the crystal state and the portion that was changed to the crystal state is recorded as a pit. In the case of the bubble foaming recording system, of the recording tracks, a recording layer of the portion irradiated with a strong laser beam is upheaved and the upheaved portion is recorded as a pit.

In the write once optical disk, in particular, a guide groove is formed (pre-groove portion) to allow tracking control of laser beam. An end face opposing the pre-groove is formed as a sine wave shape (generally referred to as a wobble shape) having a predetermined amplitude and a predetermined period along the track. When this wobble shape is optically detected by laser beam, it is possible to obtain a wobble signal serving as absolute time information. The wobble signal is used to control the system of the recording and reproducing apparatus and, in particular, the timing information for recording pits on the optical disk. Further, the wobble signal is used to servo-control an optical disk rotating and driving means, e.g., a spindle motor. According to the servo control operation, the rotational speed of the spindle motor is controlled such that the period of the wobble signal becomes constant.

The above write once optical disk is generally of a groove recording 10 system where pits are recorded on the pre-groove portion. When information data that is to be recorded on the write once optical disk is recorded, a target position is synchronously searched based on the period of the wobble signal obtained by optically detecting the wobble shape formed on the pre-groove portion. When the target position is detected, the above information data that is to be recorded on the write once optical disk is recorded on the target position according to a predetermined format.

On the other hand, upon reproduction, a target position is searched as described above. When the target position is detected, based on a frame synchronizing signal inserted into the data to be recorded on the write once optical disk, 2 kilobytes of data, for example, are sequentially read out, thereby reproducing recorded data.

Since the read-only optical disk and the write once optical disk are the same in reproduction principle as described above, even when the write once optical disk is loaded onto a reproducing apparatus which reproduces an information signal from the read-only optical disk, data recorded on the write once optical disk can be reproduced without distinction of the read-only optical disk.

In addition, the write once optical disk has a feature that allows a number of optical disks to be easily produced by relatively simple equipment. For this reason, there is the risk that the write once optical disk will be illegally copied (illegal copy). Specifically, initially, there is a computer system wherein a reproducing apparatus for reproducing an information signal from a read-only optical disk is connected to one external input and output terminal of a personal computer used by the end user. For example, and an external storage device for recording and reproducing an information signal on and from the write once optical disk is connected to another external input and output terminal. Then, recorded data that had been read out from the read-only optical disk by the reproducing apparatus are all written in the write once optical disk by the external storage device, thereby producing a pirate edition of the read-only optical disk.

In this case, if the read-only optical-disk is a CD-ROM where computer data (including computer program) are recorded, then a pirate edition of game software can be easily produced. If the read-only optical disk is a compact disc (CD) where music information are recorded, then it becomes possible to easily produce a pirate edition of the compact disc. Since computer programs are copyrighted material protected by copyright, copies—except those made by the regular user, i.e., registered users who accepted the software license agreement (software license agreement)— for backup or copies for the hard disk are illegal.

Further, copy for thoroughly copying recorded data on the CD-ROM which is a copyright material to the write once optical disk for the purpose of action of concession in distribution is also illegal and such illegal action for obtaining unfair profit should be prevented.

Furthermore, an act wherein a regular user makes a free distribution for those who are not regular users in an enterprise or CAI (Computer Assisted Instruction) is regarded as serious.

At present, there are a variety of proposed methods for copy protection many of which have been reduced to practice. On the other hand, a software (program or the like) called "copy tool" used in removing copy protection is now commercially available. Short of the user's own conscience, there is currently no other way to prevent the illegal copying of recorded data.

In view of the aforesaid, it is an object of the present invention to provide a data recording method wherein an illegal copy between disk-like recording mediums can be effectively protected even against a copy tool and in which copyrighted material (recorded data) recorded on the disk-like recording medium can be protected.

Interactive productions allow a user of a computer system to interact with movies, video or other displayed images while the images are being updated at a rapid rate. The purpose of these productions is to present useful information, educate or entertain the user. The ultimate goal of interactive technology is to make the user feel as though they are interacting with images on the screen so that, for example, characters or objects in a drama react to the users actions. The user's actions can affect characters, objects or other images on the display screen and change the course of the storyline.

One method for providing a high degree of interaction is to make the production completely computer generated. This means that the computer models a three dimensional world and calculates and displays the orientation of figures and objects on the screen. However, this approach is limited by today's technology because the computing power to fully calculate and render lifelike images, especially human figures, at resolutions approaching television quality in real time at video or film refresh rates is beyond the current technology for mass-marketed systems.

A different approach is to prerecord video, film or computer generated image sequences and play the prerecorded images, or frames, back at high speed. This achieves the resolution of television, or better, and is sufficiently lifelike to create a level of believability comparable to television. However, in this approach the user has a very limited amount of interactivity with the production since the user's ability to affect the story is limited to the small number of different "paths" of prerecorded image sequences that are branched to at predetermined decision points in the video or animation sequence. The use of any prerecorded sequences of images that are played back so as to achieve animation while allowing a user to interact with the images is referred to broadly here as "interactive video."

Interactive video productions typically use a compact disc read-only memory (CD-ROM) disc to store the images and a CD-ROM drive to retrieve images during playback. The CD-ROM disc stores information in a concentric spiral on optical media and is "read" or played back with a CD-ROM drive that uses a "read head" with a laser beam. The big problem with CD-ROM based interactive production is the break in continuity due to delays of about a half-second or more required to locate a desired branch path that is different from the current path that the drive's read head is tracking. Another problem is that CD-ROM based interactive video productions are severely limited in the number and types of ways that a user may interact with the video.

The length of time to access a different video path ("access time" or "seek time") depends upon the location of the different video path with respect to the current placement of the CD-ROM drive's read head. In order to access a given video sequence, a computer controller looks up the location of the sequence in an index and instructs the CD-ROM drive to access the new sequence by moving the read head to the beginning of the new sequence on the disc. Since the read head is moved by a mechanical mechanism it takes a comparatively long time to reposition the read head to a new point on the track to access the different video path.

The prior art uses caches to try to improve the performance of accessing data in a CD-ROM. The cache can be in the CD-ROM drive, in an interface card between the processor and the drive, in the memory of the computer system controlled by software or even on a hard disk or other storage medium. However, these caches only provide marginal improvement in access times where video is concerned because of the relatively small sizes of the caches compared to the data rate of the information coming off of the CD-ROM. Also, when a different path is branched to the information in the caches is usually useless since they don't contain the new data. The caches must be "purged" and loaded with new information.

While current CD-ROM drives are not adequate to provide sufficient interactivity in interactive video productions, they represent a huge installed base since hundreds of thousands have already been sold to consumers. Therefore, a system which eliminates the access time in CD-ROM based interactive videos without requiring modification of existing CD-ROM drives is desired.

Conventionally, a so-called LD (Laser Disk) and a so-called CD (Compact Disk) are generalized as optical disks, on which information such as video information, audio information and the like is recorded. On the LD or the like, the video information and the audio information are recorded together with time information indicating a time at which each information is to be reproduced with respect to a reproduction start position, which each LD or the like has, as a standard position. Thus, other than a general normal reproduction to reproduce the recorded information in the order of recording, various special reproductions are possible, such as a reproduction to extract and listen to an only desirable music out of a plurality of recorded musics, a reproduction to listen to the recorded musics in a random order and so on, in case of the CD, for example.

However, there is a problem that, according to the above mentioned LD or the like, a so-called interactive and variegated reproduction is not possible in which the audience can have a plurality of selection branches as for the video or audio information to be displayed or sound-outputted and in which the audience can select them to watch or listen to it. Namely, for example, in case of giving audience to a foreign movie on the LD, it is not possible to select one of languages to be used for a subtitle (caption) displayed on the picture plane (e.g., select one of the subtitle in Japanese and the subtitle in the original language) so as to display the subtitle in the selected language, or, in case of giving audience to a music recorded on the CD, it is not possible to select one of sound voices of the music (e.g., select one of the English lyric and the Japanese lyric).

On the other hand, various proposals and developments are being made as for the DVD, as an optical disk in which the memory capacity is improved by about ten times without changing the size of the optical disk itself as compared with the aforementioned conventional CD. With respect to this DVD, if a plurality of subtitles in various languages or a plurality of voice sounds in various languages are recorded, the above mentioned interactive and variegated reproduction is possible as the audience selects one of them.

However, the information amount of the audio information or music information becomes enormous if the audio or voice sounds in various languages or the music in various types are recorded on the above mentioned DVD. At this time, if the information is not recorded in an appropriate recording form, the process for searching the audio information etc. to be reproduced becomes complicated, and a case where the audio sound or music sound etc. is interrupted in the middle of the reproduction due to the time required to search the audio information etc. may happen at the time of reproduction, which is a problem.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for permitting selective access to multimedia data on a standalone electronic storage medium comprising the steps of:
    (a) reading an identifier stored on the electronic storage medium by software on a device after inserting the electronic storage medium into the device wherein the identifier identifies a specific instance of the electronic storage medium;
    (b) transferring the identifier to a location of a separate database by software on the device;
    (c) verifying at the separate database that a matching identifier already exists in the separate database; and
    (d) precluding access to the data upon unsuccessful verification of the identifier.

2. The method for permitting selective access to data based on an identifier stored on an electronic storage medium as recited in claim 1 further comprising effecting a remote link between the device and the separate database to verify that a matching identifier already exists in the separate database.

3. The method for permitting selective access to data based on an identifier stored on an electronic storage medium as recited in claim 1, wherein the verification includes combining identifier information associated with the identifier and user information associated with the user and looking up both the identifier information and the user information on the separate database.

4. The method for permitting selective access to data based on an identifier stored on an electronic storage medium as recited in claim 1 further comprising storing for future reference a record of the steps of the method on the separate database.

5. The method for permitting selective access to data based on an identifier stored on an electronic storage medium as recited in claim 1, wherein the computer is remotely coupled to the separate database via a network.

6. The method for permitting selective access to data based on an identifier stored on an electronic storage medium as recited in claim 5, wherein the network is the Internet.

7. The method for permitting selective access to data based on an identifier stored on an electronic storage medium as recited in claim 5, wherein the data is embodied on a website.

8. The method for permitting selective access to data based on an identifier stored on an electronic storage medium as recited in claim 1, wherein the electronic storage medium is an optical disc.

9. The method for permitting selective access to data based on an identifier stored on an electronic storage medium as recited in claim 8, wherein the identifier is stored on a burst cut area of the optical disc.

10. The method for permitting selective access to data based on an identifier stored on an electronic storage medium as recited in claim 1, wherein the data is stored in a remote database.

11. A computer readable medium embodying a computer program for permitting selective access to data stored on a standalone electronic storage medium wherein the computer program comprises:
    (a) a code segment for reading an identifier stored on the electronic storage medium after inserting the electronic storage medium into the computer wherein the identifier identifies a specific instance of the electronic storage medium;
    (b) a code segment for transferring the identifier to a location of a separate database;
    (c) a code segment for verifying at the separate database that a matching identifier already exists in the separate database; and
    (d) a code segment for precluding access to data in the electronic storage medium upon unsuccessful verification of the identifier.

12. The computer readable medium embodying a computer program for permitting selective access to data based on an identifier stored on an electronic storage medium as recited in claim 11 further comprising a code segment for effecting a remote link between the device and the separate database to verify that a matching identifier already exists in the separate database.

13. The computer program for permitting selective access to data based on an identifier stored on an electronic storage medium as recited in claim 11, wherein the verification includes combining identifier information associated with the identifier and user information associated with the user and looking up both the identifier information and the user information on the separate database.

14. The computer readable medium embodying a computer program for permitting selective access to data based on an identifier stored on an electronic storage medium as recited in claim 11 further comprising a code segment for storing for future reference a record of the steps of the method on the separate database.

15. The computer program for permitting selective access to data based on an identifier stored on an electronic storage medium as recited in claim 11, wherein the computer is remotely coupled to the separate database via a network.

16. The computer program for permitting selective access to data based on an identifier stored on an electronic storage medium as recited in claim 15, wherein the network utilizes an internet protocol.

17. The computer program for permitting selective access to data based on an identifier stored on an electronic storage medium as recited in claim 15, wherein the data is embodied on a website.

18. The computer program for permitting selective access to data based on an identifier stored on an electronic storage medium as recited in claim 11, wherein the electronic storage medium is an optical disc.

19. The computer program for permitting selective access to data based on an identifier stored on an electronic storage medium as recited in claim 18, wherein the identifier is stored on a burst cut area of the optical disc.

20. The computer program for permitting selective access to data based on an identifier stored on an electronic storage medium as recited in claim 11, wherein the data is stored in a remote database.

* * * * *